United States Patent [19]
Furay et al.

[11] Patent Number: 6,032,352
[45] Date of Patent: *Mar. 7, 2000

[54] METHOD OF MANUFACTURING RIGID DISK DRIVE WITH DYNAMIC HEAD LOADING APPARATUS

[75] Inventors: David M. Furay, Boulder; James H. Morehouse, Pagosa Springs; Bruce D. Emo, Boulder; Robert A. Alt, Longmont, all of Colo.

[73] Assignee: Mobile Storage Technology Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/731,501

[22] Filed: Oct. 16, 1996

Related U.S. Application Data

[62] Division of application No. 08/659,464, Jun. 6, 1996, which is a continuation of application No. 08/105,524, Aug. 11, 1993, which is a continuation-in-part of application No. 07/766,479, Sep. 25, 1991, Pat. No. 5,237,472, which is a continuation-in-part of application No. 07/629,957, Dec. 19, 1990, Pat. No. 5,289,325.

[51] Int. Cl.$^7$ .......................................................... G11B 5/27
[52] U.S. Cl. ......................................... 29/603.03; 360/103
[58] Field of Search ......................... 29/603.03; 360/103, 360/104, 105, 106

[56] References Cited

U.S. PATENT DOCUMENTS

| | | |
|---|---|---|
| 3,531,788 | 9/1970 | Brown et al. . |
| 3,984,873 | 10/1976 | Pejcha . |
| 4,518,904 | 5/1985 | MacLeod et al. . |
| 4,535,374 | 8/1985 | Anderson et al. . |
| 4,568,988 | 2/1986 | McGinlay et al. . |
| 4,638,383 | 1/1987 | McGinlay et al. . |
| 4,663,682 | 5/1987 | McNeil . |
| 4,683,506 | 7/1987 | Toldi et al. . |
| 4,752,848 | 6/1988 | Garcia et al. . |
| 4,772,974 | 9/1988 | Moon et al. . |

(List continued on next page.)

FOREIGN PATENT DOCUMENTS

| | | |
|---|---|---|
| 2-312075 | 12/1990 | Japan . |
| 5-135530 | 6/1993 | Japan . |

OTHER PUBLICATIONS

Quantum Corporation publication entitled "Quantum Low Power Products: Go Drive–2 1/2–inch Hard Disk Drives, ProDrive Gem Series–3 1/2–inch Small Frame Drives, Technical Highlights", Sept. 1990, pp. 1–5.

Photocopy of a one–page description of the LaPine Technology Titan 20 disk drive using a rotary actuator and a pivoting rod for loading and unloading the magnetic transducer with respect to the disk surface.

PrairieTek Corporation rigid disk drive model Prairie 120, (i) photocopies of two photographs (labelled 16a and 16b) illustrating respectively a top view of the drive and a view of the load beam and ramp, (ii) photocopy of a drawing (labelled 16c) illustrating portions of the load beam and cam, and (iii) a photocopy of a brochure (labelled 16d).

(List continued on next page.)

*Primary Examiner*—David P. Bryant
*Attorney, Agent, or Firm*—Skjerven, Morrill, MacPherson, Franklin & Friel LLP; David W. Heid

[57] ABSTRACT

A method of manufacturing a rigid disk drive of the dynamic head loading type which includes a rotary actuator, and a load beam having a lift tab which cooperates with a cam surface of a cam assembly to load and unload a read/write recording element with respect to a surface of a disk. The method includes positioning the left tab so that it extends along an axis which is displaced with respect to a center line of the load beam. The method also includes providing the cam surface with a detent. The method of manufacturing further includes providing a portion of said lift tab with a cylindrical shape.

73 Claims, 20 Drawing Sheets

U.S. PATENT DOCUMENTS

| | | |
|---|---|---|
| 4,839,756 | 6/1989 | Chew et al. . |
| 4,853,811 | 8/1989 | Brooks, Jr. et al. .................... 360/103 |
| 4,870,703 | 9/1989 | Augeri et al. . |
| 4,933,785 | 6/1990 | Morehouse et al. . |
| 5,023,737 | 6/1991 | Yaeger . |
| 5,025,335 | 6/1991 | Stefansky . |
| 5,027,241 | 6/1991 | Hatch et al. . |
| 5,034,837 | 7/1991 | Schmitz . |
| 5,081,552 | 1/1992 | Glaser et al. . |
| 5,148,339 | 9/1992 | Yoshida et al. . |
| 5,189,575 | 2/1993 | Onooka et al. . |
| 5,208,712 | 5/1993 | Hatch et al. . |
| 5,231,549 | 7/1993 | Morehouse et al. . |
| 5,237,472 | 8/1993 | Morehouse et al. . |
| 5,289,325 | 2/1994 | Morehouse et al. . |
| 5,862,018 | 1/1999 | Vera et al. .............................. 360/105 |
| 5,875,072 | 2/1999 | Brooks, Jr. et al. .................... 360/104 |
| B1 4,568,988 | 11/1988 | McGinlay et al. . |
| B1 4,638,383 | 11/1988 | McGinlay et al. . |

OTHER PUBLICATIONS

Rothbart, Harold A., "Mechanical Design and Systems Handbook" (McGraw–Hill Book Company, Inc.), pp. 5–1 through 5–3.

Shigley, Joseph E., "Mechanical Engineering Design" (McGraw–Hill Book Company, Inc.) , pp. 549–550.

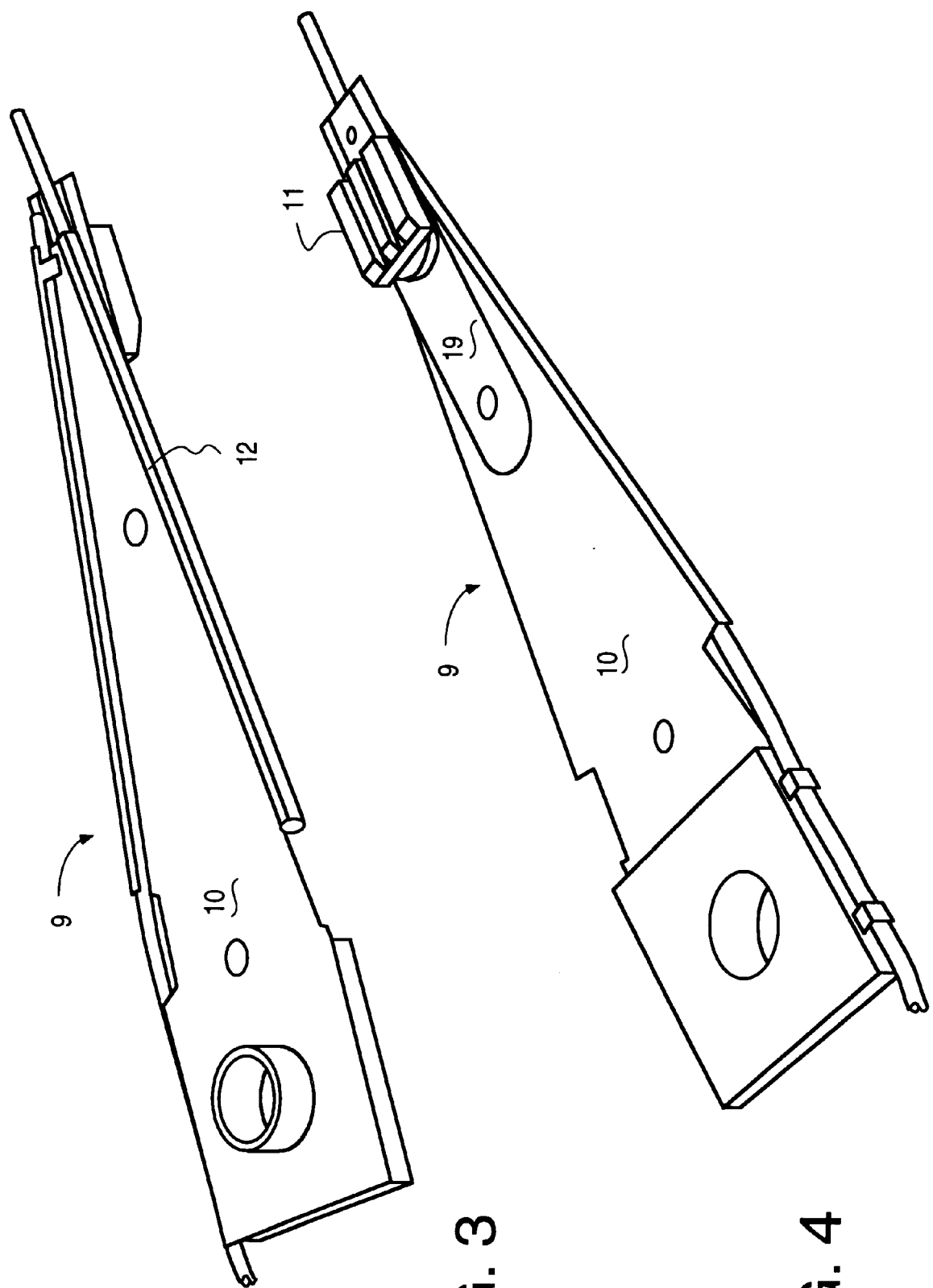

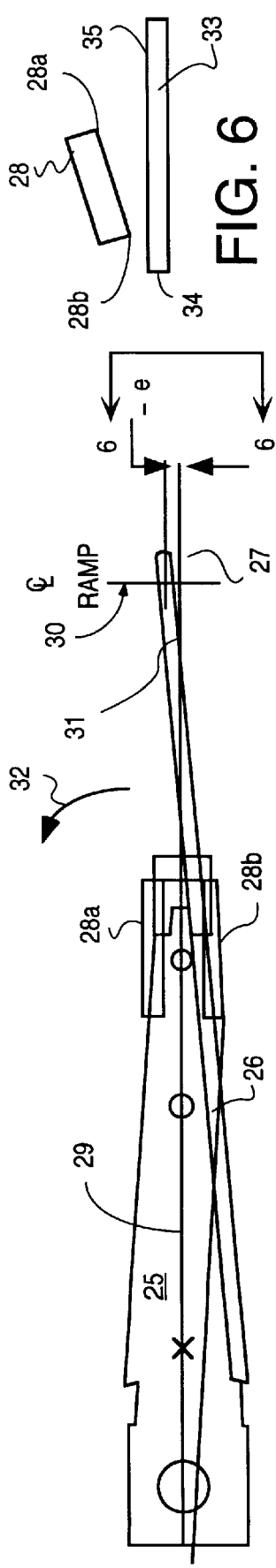
FIG. 5a
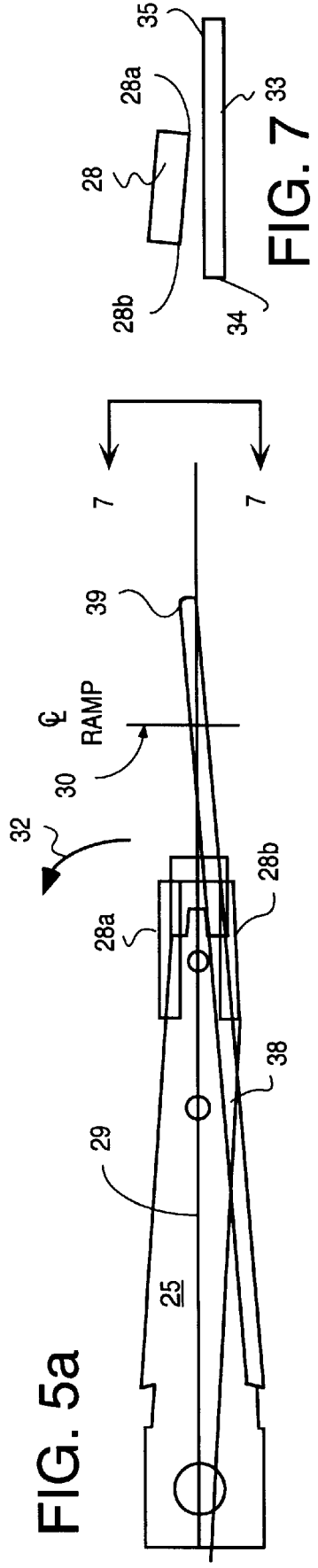
FIG. 5b
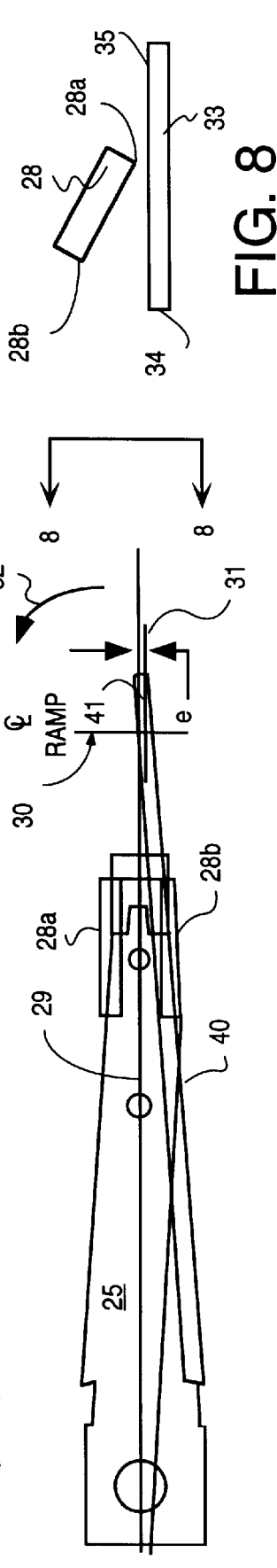
FIG. 5c
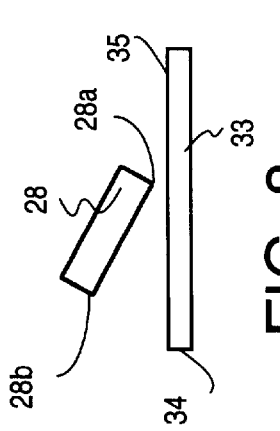
FIG. 6
FIG. 7
FIG. 8

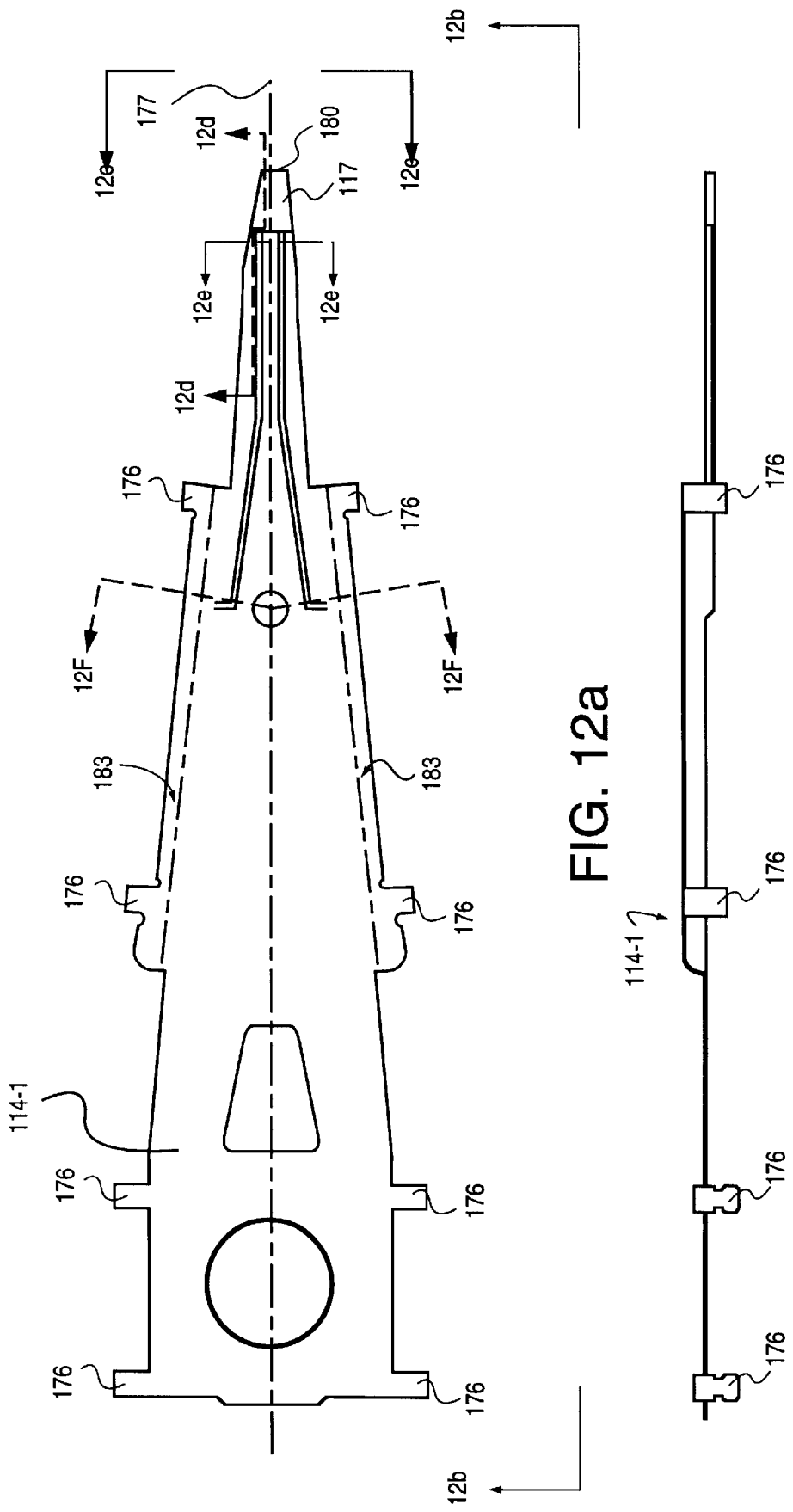

METHOD OF MANUFACTURING RIGID DISK DRIVE WITH DYNAMIC HEAD LOADING APPARATUS

CROSS-REFERENCE TO RELATED APPLICATIONS

This application is a division of U.S. patent application Ser. No. 08/659,464, filed Jun. 6, 1996 by David M. Furay, James H. Morehouse, Bruce D. Emo and Robert A. Alt, entitled "Rigid Disk Drive with Dynamic Head Loading Apparatus and Method of Manufacturing a Rigid Disk Drive with Dynamic Head Loading Apparatus", which is a continuation of application Ser. No. 08/105,524, filed Aug. 11, 1993 by David M. Furay, James H. Morehouse, Bruce D. Emo and Robert A. Alt, entitled "Rigid Disk Drive with Dynamic Head Loading Apparatus", which was a continuation-in-part of U.S. patent application Ser. No. 07/766,479, filed Sep. 25, 1991 by James H. Morehouse, David M. Furay, James A. Dunckley and Bruce D. Emo, entitled "Rigid Disk Drive With Dynamic Head Loading Apparatus", now U.S. Pat. No. 5,237,472, issued Aug. 17, 1993, which was a continuation-in-part of U.S. patent application Ser. No. 07/629,957 filed Dec. 19, 1990 by James H. Morehouse, David M. Furay and James A. Dunckley, entitled "Rigid Disk Drive With Dynamic Head Loading Apparatus" now U.S. Pat. No. 5,289,325, issued Feb. 22, 1994.

BACKGROUND OF THE INVENTION

1. Field of the Invention

This invention relates to the field of information storage utilizing rigid disks, and more particularly to apparatus for dynamically loading and unloading read/write magnetic recording elements for flight above the surface of moving magnetic media.

2. Description of the Prior Art

In certain types of disk files which include rigid magnetic media it is desirable to load and unload a magnetic recording reproducing element into flight above the surface of the moving media as opposed to utilizing take off from and landing on the magnetic media where the magnetic recording element comes to rest on the disk after rotation has ceased and takes off from the disk after the disk is once again spun up. U.S. Pat. No. 4,535,374 to Anderson et al., issued Aug. 13, 1985, is exemplary of a rigid disk drive of the linear actuator type which provides for dynamic loading of magnetic read/write heads above the surface of a disk. In Anderson et al. a stationary cam follower is provided on and supported from the housing, and the load arm, which includes a magnetic recording head at its free end, is provided with a cam surface intermediate the free end and the end supported by the actuator. The cam surface cooperates with a stationary cam to lift the head above the surface of the disk when the head arm is retracted.

Another linear actuator rigid disk drive utilizing a cam arrangement to achieve dynamic loading of the magnetic recording head above the disk is illustrated in U.S. Pat. No. 4,663,682 to McNeil, issued May 5, 1987. In McNeil, a pair of cam surfaces are supported by the disk drive housing and a wing, having a pair of free ends, is attached to the load beam intermediate the actuator driving mechanism and the free end of the load beam which supports the head slider. The free ends of the wing cooperate with the cam surfaces to lift the magnetic recording head slider above the surface of the disk when the head arm is retracted. In McNeil, the direction of movement of the magnetic media beneath the magnetic recording head is such that the media is moving in a direction which is parallel to the longitudinal axis of the slider on which the magnetic recording element is supported and perpendicular to the longitudinal axis of load beam. The cam surfaces in McNeil are offset and provide pitch to the slider during the loading process when the slider is approaching the surface of the rotating media.

U.S. Pat. No. 4,933,785 to Morehouse et al., issued Jun. 12, 1990, and assigned to Prairietek Corporation, discloses a magnetic disk drive utilizing a rotary actuator. The load beams (which support the read/write elements) each include a lift button which is supported on the load beam, and positioned on the longitudinal axis of the load beam. The lift buttons cooperate with a spreader, which includes cam surfaces, to provide dynamic loading and unloading of the slider which is supported on the end of the load beam opposite of the pivot point of the load beam. The buttons and the cooperating spreader with cam surfaces are located intermediate the pivot point of the rotary actuator and the magnetic head. The button and cam surface on the spreader provide a symmetrical lift to the load beam and correspondingly symmetrical loading of the magnet head above the media, which in this configuration is rotating in the direction beneath the head which is substantially parallel to the longitudinal axis of the load beam which is supporting the slider.

A later introduced rigid disk drive from Prairietek Corporation, utilized a dynamic loading structure having a cam surface supported on the housing which contacted directly the load beam of the rotary arm having the magnetic slider on its free end. In this Prairietek hard disk drive, denominated the model 120, the cam is supported on the housing and is positioned intermediate the head slider and the pivot point of the rotary actuator. The principle distinction between the dynamic loading structure in the model 120 over the structure illustrated in the '785 patent is the elimination of the button which was included on the load beam and provided a center line lift on the load beam. In the model 120 disk drive a heavy roll torque is applied to the load beam and there is no ability to change the amount of torque and correspondingly the roll applied to load beam.

U.S. Pat. No. 3,984,873, issued Oct. 5, 1976 to Pejcha illustrates a structure for dynamically loading heads, which in one embodiment utilizes a movable channel member which is supported above the surface of the rotating rigid disk. The loading of a head above the surface of the disk is achieved by providing flat spring extensions which extend symmetrically from the free end of the load beam and are captured in the channel which is positioned in a plane above the surface of the disk such that the opening is generally parallel to the plane of the disk. With the spring extensions captured in the channel, the heads are prevented from being loaded on the disk. To load the heads the channel member is moved out of contact with the flat spring extensions and the heads move toward the surface of the associated disk. In another embodiment, the flat spring extensions on the ends of the load beam are crisscrossed and a pivoted member is moved into contact with the crisscrossed free ends to unload the heads from the disk. In a third embodiment, a cam surface is provided adjacent to the edge of the rotating disk and the magnetic head is supported on a spring member which is affixed by bolts to a rotating arm. An extension of the spring member on the end adjacent to the magnetic head is positioned at right angles with respect to the center line of the rotary arm on which the head and spring is mounted, with the spring extension having a longitudinal axis which is parallel to the longitudinal axis of the cam surface.

U.S. Pat. No. 5,027,241, issued Jun. 25, 1991 to Hatch et al. illustrates a rotary actuator using a dynamic loading tab which extends from the end of the load beam. In Hatch et al., the load tab (which cooperates with a cam for loading and unloading the slider from the surface of the disk) extends outwardly from the end of the load beam and is symmetrically aligned with the centerline of the load beam. Although this provides geometric symmetry, it does not provide zero torque on the load beam as it is lifted from the disk. In contrast, in accordance with one embodiment of the present invention an asymmetrically positioned lift tab is used whereby the amount of roll provided to the slider as it is lifted from the surface of the disk can be fine tuned to an optimum level. In a second embodiment of the present invention a lift tab structure which provides a zero torque force on the load beam is provided. This is achieved by utilizing an offset load tab.

A number of the prior disk drives employing dynamic head loading utilized a cam arrangement in which a portion of the cam extended over the surface of the magnetic recording disk. With the continuing desire to produce disk drives which are more compact, the requirement of having a portion of the cam surface extend above the surface of the disk made it more difficult to reduce the disk-to-disk spacing, and accordingly more difficult to reduce the height of the disk drive. Additionally, this requirement made it more difficult to design an effective cam in view of constraints, such as, the type of material from which the cam could be constructed. This is particularly troublesome in drives using a plurality of disks where all of the disk surfaces are used for storing information. Additionally, in disk drives in which a portion of the cam surface extended above the magnetic disk, assembly of the drive was made somewhat more difficult since if the cam assembly were installed prior to installation of the magnetic disks in the housing, it was necessary to either pivot the cam assembly out of the way of the disks during installation or to install the cam assembly after the disks had been installed. In accordance with one embodiment of the present invention, a cam assembly is provided which is constructed such that no portion of the cam assembly extends over a surface of any of the recording disks, thus eliminating the necessity to take special precautions when installing the magnetic disks, and secondly eliminating the necessity of providing space for portions of the cam surfaces between adjacent disks.

SUMMARY OF THE INVENTION

An object of the present invention is to provide a rigid disk drive which includes a dynamic head loading structure which imparts a roll to the head slider as it is being loaded onto a rotating disk. Another object of the present invention is to provide means to control the dynamic head loading structure such that the amount of roll imparted to the head slider is adjustable. An additional object of the present invention is to provide a dynamic head loading structure which provides zero torque on the load beam as it is being lifted from the surface of the disk. A further object of the present invention is to provide a dynamic head loading structure for a rotary actuator in which the rotary actuator can be loaded into operative relationship with a cam assembly from the back side of the cam assembly to simplify the initial assembly of the rotary actuator structure in the drive as well as avoiding damaging the disk surface. A further object of the present invention is to provide a dynamic loading structure which is uncomplicated and can be constructed from readily available components. A further object of the present invention is to provide a means to protect the magnetic heads of a rigid disk drive which are facing when the heads are unloaded from the surface of the disk. Yet another object of the present invention is to provide a disk drive with dynamic head loading structure which utilizes a cam assembly which does not extend within the area of the magnetic recording disks.

In accordance with one embodiment of the present invention, a lift tab is provided on the free end of an actuator arm which supports a slider for travel on an air bearing above the surface of a rigid magnetic recording disk. The lift tab is positioned such that is extends from the free end of the actuator arm at an angle which is skewed from the longitudinal axis of the actuator arm. The lift tab cooperates with a cam surface (which is supported on the baseplate) and as a result of the asymmetrical location of the lift tab with respect to the longitudinal axis of the actuator arm, the actuator arm is pivoted, which provides a roll orientation to the slider as it is loaded onto the disk.

In accordance with a second embodiment of the present invention, the lift tab provided on the free end of the actuator arm is positioned in an axis which is displaced from the longitudinal axis of the load beam by an amount which is selected such that the lifting force on the load beam is applied generally along the longitudinal axis of the load beam to avoid any twisting torque being applied to the load beam.

In accordance with a third embodiment of the present invention, a dynamic load beam structure is provided in which the lift tab having the offset end portion is a separate structural element from the main body of the load beam.

In accordance with a fourth embodiment of the present invention, a disk drive is provided which features a dynamic head loading structure in which a cam assembly is positioned adjacent to the edge of a rotating magnetic disk and in cooperation with a head gimbal assembly having a lift tab extending beyond the magnetic transducer utilized on the head gimbal assembly provides dynamic head loading without the necessity of having any portion of the cam assembly positioned within the area bounded by the magnetic recording disk.

Further aspects of the present invention relate to a method of manufacturing a rigid disk drive of the dynamic head loading type, including rigid disk drives in which: a lift tab is provided on a load beam and the lift tab extends along an axis which is displaced with respect to the centerline of the load beam; a cam surface of a cam assembly includes a detent position; and rigid disk dries in which the lift tab includes a curvilinear portion for contacting a cam surface of a cam assembly.

BRIEF DESCRIPTION OF THE DRAWINGS

Other objects and advantages of the invention will become apparent from a study of the specification and drawings in which:

FIG. 3 is a perspective view of the head gimbal assembly of FIG. 2;

FIG. 4 is a perspective view of the lower side of the head gimbal assembly illustrated in FIG. 3;

FIGS. 5a–5c illustrate the structure for achieving negative roll, no roll and positive roll for a slider supported on a head gimbal assembly;

FIGS. 6 to 8 illustrate, respectively, a slider having a negative roll, no roll and positive roll attitudes;

FIG. 12a is a plan view of a load beam utilized in the second dynamic head-loading embodiment of the present invention;

FIG. 12b is a view taken along lines 12b—12b in FIG. 12a;

FIG. 12c is a view taken along lines 12c—12c in FIG. 12a;

FIG. 12c-1 is a top plan view of a portion of a load beam used in the second embodiment of the present invention;

FIG. 12c-2 is a cross sectional view taken along lines 12c-2—12c-2 in FIG. 12c-1;

FIG. 12d is a cross-sectional view taken along lines 12d—12d in FIG. 12a;

FIG. 12e is a cross-sectional view taken along lines 12e—12e in FIG. 12a;

FIG. 12f is a cross-sectional view taken along lines 12f—12f in FIG. 12a;

DETAILED DESCRIPTION OF THE PREFERRED EMBODIMENTS

Figure 1:
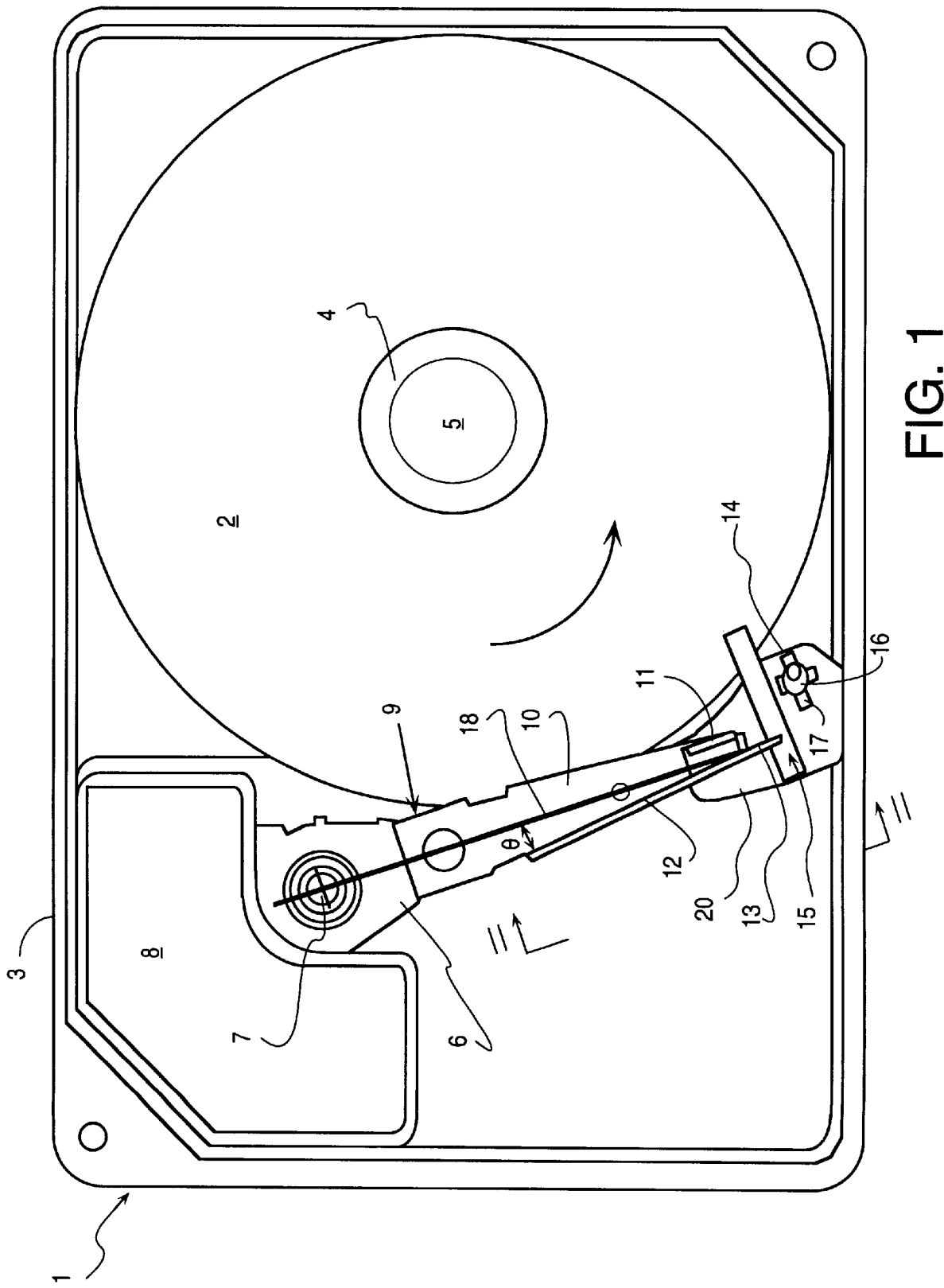
FIG. 1 is a top plan view of a rigid disk drive incorporating the dynamic head loading apparatus in accordance with the present invention.
Figure 2:
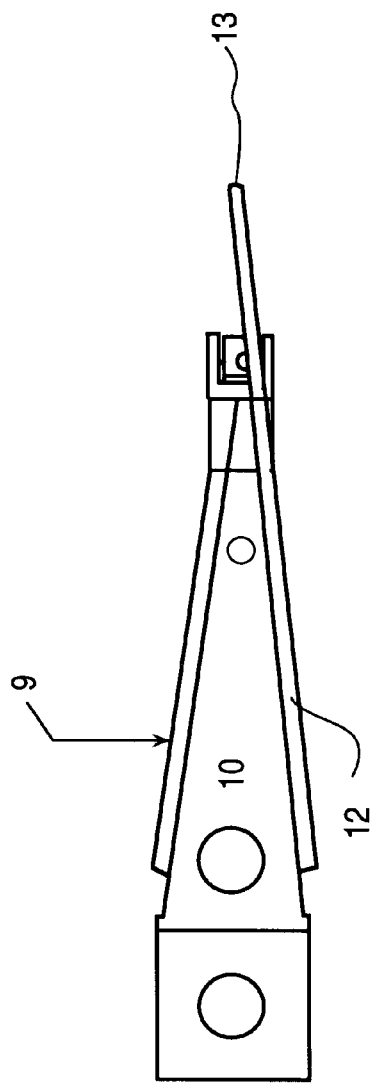
FIG. 2 is a top plan view of the down-facing head gimbal assembly utilized in the rigid disk drive of FIG. 1.

Referring to FIG. 1, rigid disk drive 1 in accordance with the first embodiment present invention illustrated in a top plan view. Rigid disk drive 1 is illustrated in highly enlarged scale for illustrative purposes. Included in rigid disk drive 1 is rigid disk 2, which may include magnetic coated surfaces for the recording and reproduction of digital information. Rigid disk 2 is supported for rotation by a suitable motor and spindle combination (not shown). Clamp 4 secures rigid disk 2 to hub 5 of the motor for rotation with the rotor portion of the motor. Rigid disk drive 1 utilizes a rotary actuator which includes actuator body 6 which rotates about a center of rotation 7. A suitable coil and permanent magnet motor (not shown) of the type well known in the art are positioned beneath return plate 8 of the permanent magnet actuator motor assembly. Although in the disclosed embodiment of the invention a permanent magnet motor is used to position the actuator, other types of suitable drive mechanisms may be used for moving the rotary actuator. Head gimbal assembly 9 is secured to actuator body 6 and rotates about center of rotation 7. Head gimbal assembly 9 includes a generally flat, triangular shaped load beam 10 which supports near its free end a slider body 11 which includes a read/write element for writing information to and reading information from magnetic recording disk 2. Attention is directed to FIGS. 2, 3 and 4 where additional views of head gimbal assembly 9 are illustrated. In accordance with the present invention, a second head gimbal assembly may be utilized beneath the surface of rigid disk 2 to provide for record and reproduction of data on the lower surface of rigid disk 2. Head gimbal assembly 9 includes lift tab 12, which in the embodiment illustrated comprises a rod, which is suitably affixed to the upper surface of load beam 10. Alternatively, the lift tab could be formed integrally with the load beam. Although in the embodiment illustrated herein lift tab 12 is positioned on the side of load-beam 10 which is beyond (with respect to the center of disk 2) center line 18, lift tab 12 could be positioned on the other side of center line 18 (that is between center line 18 and the edge of load beam 10 which is nearer the center of disk 2). Supported in operative relationship with the free end 13 of lift tab 12 is a cam assembly 14 which is supported on baseplate 3. Included on cam assembly 14 is cam surface 15, the contour of which will be best appreciated by reference to FIG. 6. Load beam 10 of head gimbal assembly 9 provides a downward force (when viewed as illustrated in FIG. 1) which maintains free end 13 of lift tab 12 in contact with cam surface 15. As will be appreciated by reference to FIGS. 1, 9 and 10, a portion of cam surface 15 extends over the upper surface of rigid disk 2. Cam assembly 14 is affixed to baseplate 3 using a suitable fastening means, such as a bolt 16 having a threaded end (not shown) which cooperates with a threaded opening (not shown) in baseplate 3. As illustrated in FIGS. 1 and 5, cross-shaped slot 17 permits adjustment of cam assembly 14 the directions indicated by the arrows in FIG. 9. Adjustability of cam assembly 14 in the direction of arrows which are generally radial with respect to the disk provides the ability to vary the landing position of the slider on the disk and thereby compensate for manufacturing tolerances. Load beam 10 may be constructed of 0.0025" thick, 300 series stainless steel, although other material may be utilized. In the embodiment illustrated herein, lift tab 12 comprises a stainless steel rod and Delrin (an acetal resin compound) is used for cam surface 15. This combination of materials provides a low friction interface, however it will of course be appreciated that other combinations of materials may be utilized. Other suitable low friction materials, such as an acetal resin compound impregnated with PTFE, or other plastic material with low friction characteristics could alternatively be used for cam surface 15. A suitable adhesive, such as an epoxy, is used to secure the stainless steel rod to load beam 10. An alternate construction would be to weld or braze rod 12 to load beam 10.

The center line of load beam 10 (indicated in FIG. 1 by reference character 18) passes through center of rotation 7 of rotation of rotary actuator 7 and extends to the free end of load beam 10. In the present embodiment, as will be appreciated by reference to FIG. 1, the center line of lift tab 12 is not parallel to center line 18 of load beam 10. The angle of deviation between center line 18 of load beam 10 and the center line of lift tab 12 is indicated in FIG. 1 by the greek letter theta ($\theta$). In the embodiment illustrated herein, lift tab 12 extends along one edge of load beam 10, however other variations may be utilized and it is not essential to the practice of the invention that lift tab 12 have its central axis parallel with an edge of load beam 10. The important relationship to be maintained with respect to the center line of lift tab 12 and the center line of load beam 10 is that the angular relationship of lift tab 12 provide an asymmetrical lifting force on load beam 10 to provide a roll attitude to slider 11 as it approaches the surface of rigid disk 2 during loading of slider 11 above disk 2. As will be described more fully hereinafter, the roll applied to the slider may be either "positive" or "negative" and both provide advantageous results. After lift tab 12 has been moved out of contact with cam surface 15, load beam 10 (and slider 11) assume an attitude such that the lower surface of slider 11 and the lower surface of load beam 10 are substantially parallel to the plane of the surface of disk 2.

Referring to FIG. 3, head gimbal assembly 9 is illustrated in perspective and it will be appreciated that lift tab 12 extends angularly with respect to the center line of load beam 10. Head gimbal assembly 9 may also be referred to as the "down" assembly since the read/write element (not shown) which is supported on slider body 11 faces down toward the upper surface of rigid disk 2 as is illustrated in the orientation in FIG. 1. With lift tab 12 in the orientation in FIG. 3, the downward force of load beam 10 tilts the inner edge of the slider 11 closer to the surface of disk 2 than the outer edge of slider 11 torque valve thereby imparting a positive roll to slider 11.

Referring to FIG. 4, which is a view of the underside of head gimbal assembly 9 illustrated in FIG. 3, slider body 11 is supported on flexure 19 for gimbaling movement above the surface of the disk 2. Head gimbal assembly 9 is of the Watrous-type, or also known as Whitney type suspension; however, the particular type of suspension is not relevant with respect to the present invention. Other suitable slider support arrangements may be utilized to couple slider 11 to actuator body 6. The asymmetrical relationship between the axis of lift tab 12 and the center line of head gimbal assembly 9 may also be appreciated by reference to FIG. 2 which is a top plan view of head gimbal assembly 9.

Attention is directed to FIGS. 5a, 5b, 5c and 6–8 wherein the relationship between the lift tab and center line of the load beam to which it is affixed, or of which it is a part, will be described to illustrate how a negative roll, no roll or a positive roll attitude is provided to the slider affixed to the load beam. First, referring to FIG. 5a, load beam 25 is illustrated, and includes lift tab 26 having a free end 27. Supported near the end of load beam 25 is slider 28 which is obscured by load beam 25, however edges 28a and 28b (also shown in FIGS. 6–8) are visible in this view. For convenience of explanation, load beam 25 is analogous to load beam 10 of the previous figures and is a "down" load beam. The center line of load beam 25 is indicated by reference character 29. With this configuration, the lift tab 26 extends outwardly and contacts a cam surface (not shown) along a center line 30. Line 31 indicates the point of contact between free end 27 of lift tab 26 and center line 31 of cam surface. It will be appreciated by reference to FIG. 5a that the intersection between the cam center line (indicated by reference character 30) and the contact point, indicated by line 31, of lift tab 26 is displaced from center line 29 of load beam 25. The amount of deviation is indicated by the arrows pointing to the center line of load beam 25 and the line of contact between lift tab 26 and the cam surface. As shown in FIG. 5a, this distance denoted as "-e" indicates the eccentricity of the geometry. The loading direction of slider 28 onto a disk is indicated by the arrow denoted by reference character 32. With the relationships indicated in FIG. 5a, a "negative" roll is imparted to slider 28 as is loaded onto a surface of a disk (not shown in FIG. 5a). Attention is directed to FIG. 6, which is a view taken along the lines 6—6 of FIG. 5a, which illustrates what is meant by a negative roll attitude which is imparted to slider 28 as it is being loaded above disk 33, the outer edge of which is indicated by reference character 34. As will be appreciated by reference to FIG. 6, edge 28a of slider 28 (which is nearer the center of disk 33 than is edge 28b) is higher above surface 35 than is edge 28b. By adjusting the point of contact between free end 27 of lift tab 26 and the contact point on the cam surface (not shown), the eccentricity value will be changed and similarly the roll attitude of slider 28 will also be changed. In the rigid disk drive of FIG. 1, this adjustment is achievable by use of cross-shaped slot 17 on cam assembly 14.

Referring to FIG. 5b, for illustrative purposes a no roll embodiment is illustrated. In FIG. 5b, load beam 25 is provided with lift tab 38 having free end 39, and lift tab 38 is dimensioned such that free end 39 contacts the cam surface (not shown) at intersection line center line 29 of load beam 25. Since the cam surface contact corresponds to the center line of load beam 25 no torque is applied to load beam 25 and accordingly no roll results. Therefore, as will be appreciated by reference to FIG. 7, upon loading of slider 28 above surface 35 of disk 33 edge 28a of slider 28 is approximately the same distance from surface 35 as is edge 28b, accordingly this is a "no roll" or zero roll loading attitude. As will be more fully pointed out hereinafter, it is desirable that when loading a slider that either a positive or negative roll be applied; however, the no roll or zero roll attitude is described for explanatory purposes.

Referring to FIG. 5c, along with FIG. 8, a positive roll implementation of a load beam with lift tab is illustrated. In FIG. 5c, lift tab 40 is shorter in length than either of lift tabs 38 or 26. Therefore, when free end 41 of lift tab 40 intersects the cam (not shown) at cam center line 31 the deviation between center line of load beam 25 and point of contact along cam center line 30 between the free end 41 of lift tab 40 provides a torque which lifts edge 28b higher above surface 35 of disk 33 than edge 28a as a result of the off center lifting provided by eccentricity "e". Referring to FIG. 8, it will be appreciated that edge 28a of slider 28 is nearer the surface 35 of disk 33 than is edge 28b (which is near outer edge 34 of disk 33). As pointed out above, a positive roll attitude (as illustrated in FIG. 8), or a negative roll attitude (as illustrated in FIG. 6), are preferable to a no roll attitude as illustrated in FIG. 7. It will be appreciated that the lift tab utilized on the load beam could be positioned on the other side of the center line and by appropriately adjusting the length of the lift tab to achieve the contact point with the cam surface positive, negative and no roll attitudes may be achieved.

The resulting torque is given by the following formula:

Torque (T)=preload×eccentricity where:
preload=force exhibited by the load beam; and
eccentricity=offset distance.

It has been found that the upper limit on torque is approximately 8–10 gm-cm. The preferable values for a device according to applicants' invention is in the range of −0.5 gm-cm<T<+0.5 gm-cm. The "−" and "+" in the foregoing range indicates negative and positive roll respectively. It will of course be appreciated that other torque values may be appropriate for different load beam structures.

Figure 9:
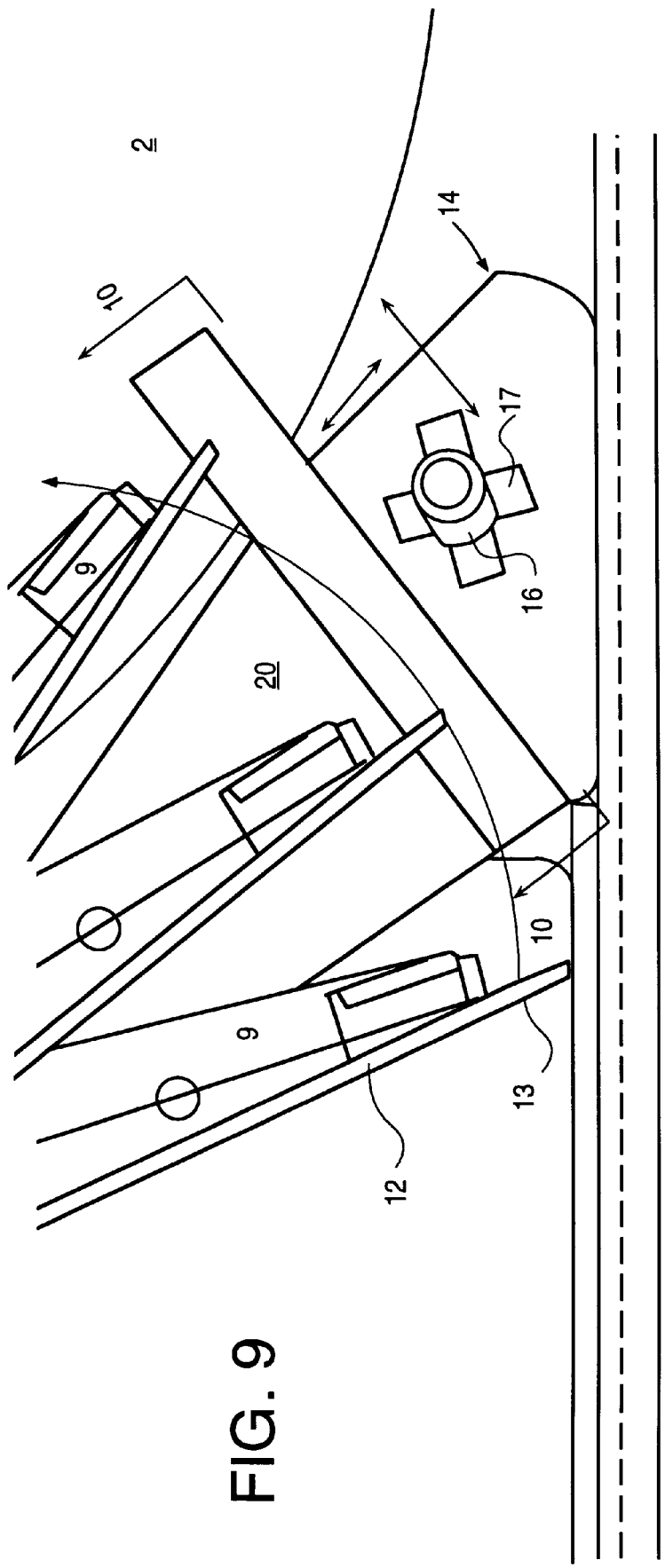
FIG. 9 is a highly enlarged view of a portion of the disk drive illustrated in FIG. 1 showing the head gimbal assembly in a plurality of locations in its travel with respect to the cooperating cam assembly.
Figure 10:
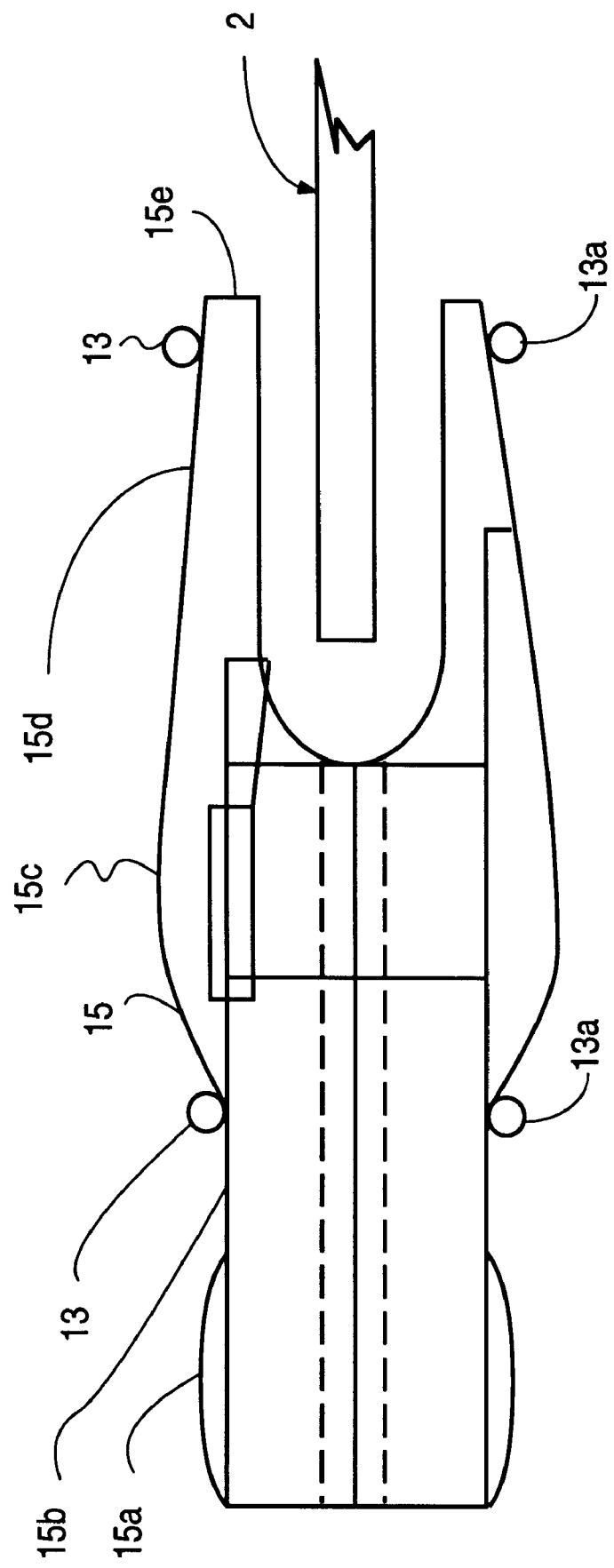
FIG. 10 is a cross-sectional view taken along the lines 10—10 in FIG. 9.

Referring to FIG. 9, a highly enlarged portion of rigid disk drive 1 (in top plan view) adjacent to the end of head gimbal assembly 9 which supports slider 11 is illustrated. In FIG. 9, head gimbal assembly 9 is illustrated in three positions for purposes of illustrating how the head gimbal assembly 9 is initially loaded and placed into position for cooperation with cam assembly 14 and further how, as best illustrated in FIG. 10, head gimbal assembly 9 and a lower head gimbal assembly if utilized, cooperates with cam assembly 14 for the dynamic loading and unloading of the sliders supported on the ends of respective head gimbal assemblies 9. The position of head gimbal assembly 9 to the left-most portion of FIG. 9 is the beginning load position after installation of the rotary actuator into the drive for initial assembly purposes. This initial installation position is illustrated in the left-hand portion of FIG. 9 in which, it will be appreciated by reference to the figure, that free end 13 of lift tab 12 is unrestrained. Head gimbal assembly 9 is rotated in a counter-clockwise direction and free end 13 of lift tab 12 travels over lobe portion 15a (as illustrated in FIG. 6) and with no further force being applied to rotate head gimbal assembly 9 free end 13 comes to rest in the detect position in valley portion 15b of cam surface 15. In FIG. 9, this position is illustrated as the central position of the three positions of head gimbal assembly 9. This is the at rest (or unloaded) position for head gimbal assembly 9 and is where the assembly would be located prior to loading the heads on the disk. In operation, during start-up power is applied the drive motor and rigid disk 2 is brought up to rotational speed after which suitable current is applied to the coil of the drive motor for the rotary actuator and head gimbal assembly 9 is rotated in a counter-clockwise direction during which free end 13 moves to the right as viewed in FIGS. 9 and 10), travels over lobe portion 15c and then down descending portion 15d of cam surface 15 to the position illustrated in the right-most portion of FIGS. 9 and 10 where slider 11 moves adjacent to the surface of disk 2. As a result of the asymmetrical position of lift tab 12 on load beam 9, during this loading operation the edge of slider 11 closer to the inner diameter of disk 2 will be lower than the edge of slider 11 nearer the outer diameter of disk 2. This provides a positive roll attitude to slider 11. It will be recalled from above that a positive roll is the type illustrated in FIG. 8.

Even though the dynamically loaded head does not contact the disk directly, after several thousand load/unloads a small amount of wear which appears as edge blending at one corner or edge of the head is evident. This blending is caused by the head contacting the higher aspirates (4 to 8 microinches high) on the disk and burnishing them off. Once the burnishing has occurred, both the lower asperity height and blended head no longer contact each other and wear does not progress. The head has sustained some minor wear (1 to 10 microinches) at a position of initial approach to the disk. This wear can be at a sensitive area of the head or an insensitive area. The tunable roll feature of the present invention permits controlling the location of the blending and guaranteeing that it occurs at a non-sensitive area.

The read/write element is generally located at the rear of the slider in order to be as close as possible to the magnetic media (most often 5 to 10 microinches flying height). If the blending occurs at the read/write gap, a change in gap separation may occur, changing the magnetic performance of the head. However, if the blending occurs along an edge of the air bearing, the flying height of the whole head is little affected since its surface area is very large compared to the blended area. By introducing some roll into the head during loading and unloading, the blending is forced away from the sensitive area and the system integrity is improved.

Referring to FIG. 10, the slope of portion 15d of cam surface 15, measured with respect to the surface of rigid disk 2, may be in the range of from about 7° to 18°. The preferable range has been found to be between about 9° to 12°. As will be appreciated by reference to FIG. 10, rigid disk 2 extends at its outer periphery interiorly at the end 15e of cam surface 15, as well as interiorly of the lower cam surface (not numbered). Adjustability of cam assembly 14 in the direction generally radial to rigid disk 2 permits, as will be appreciated by reference to FIGS. 9 and 10, adjustment of the landing position of slider body 11 on the surface of rigid disk 2.

Figure 11:
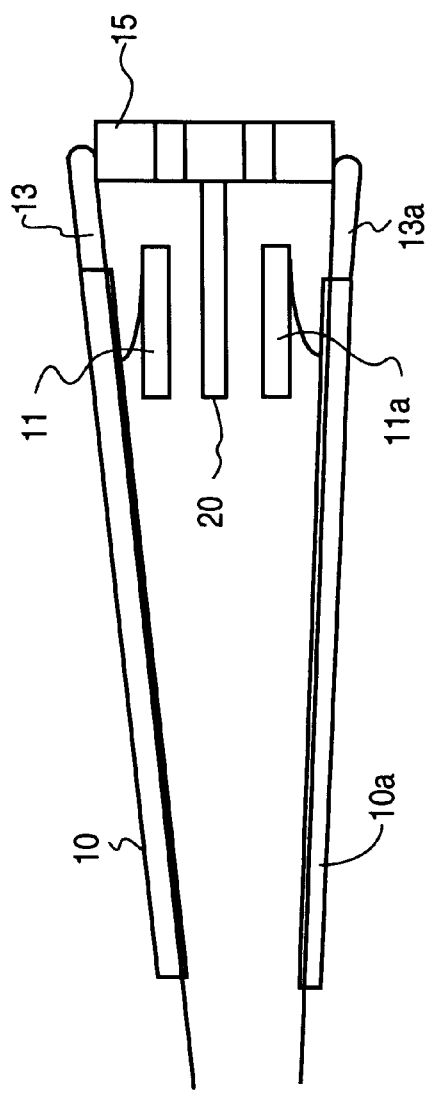
FIG. 11 is a cross-sectional view taken along the line 11—11 of FIG. 1.

As mentioned previously, a second head gimbal assembly may be supported beneath head gimbal assembly 9. By utilizing a similar support arrangement to that used for head gimbal assembly 9, the second head gimbal assembly with its associated slider and read/write element may be dynamically loaded into operative relationship with the lower surface of disk 2. In FIG. 10 reference characters 13a indicate the respective detent and load positions of the end of a lift tab used on a lower gimbal assembly. When upper and lower actuator arms are utilized, it is desirable to include protective member 20 (illustrated in FIGS. 1, 9 and 11) which extends intermediate the upper and lower head gimbal assemblies and is positioned in a plane generally parallel with the plane of disk 2. Referring to FIG. 11, a view along the lines of 11—11 of FIG. 1 is provided to better illustrate protective member 20. In FIG. 11, up load beam 10a along with its associated up slider 11a and free end 13a of up load beam 10a are illustrated, along with load beam 10, down slider 11 and lift tab 12 with its free end 13, all in the unloaded position. For simplification of view, rigid disk 2 and the remaining portion of cam assembly 14 are not shown in FIG. 11. It will be appreciated by a reference to FIG. 11 that protective member 20 prevents the unwanted impact between slider 11 and slider 11a should a shock be transmitted to disk drive 1 while the sliders are in the unloaded position. When the head gimbal assemblies are positioned outside of the travel above the surface of disk 2, by utilizing protective member 20 shocks which may be transmitted to disk drive 1 which would move flexure 19 and would otherwise cause slider 11 to impact up slider 11a of up load beam 10a are no longer a problem since protective member 20 prevents slider-to-slider impacts. Without the use of protective member 20, the read/write elements on their respective sliders may be damaged. Protective member 20 also limits destructive overtravel of flexure 19. Protective member 20 may either be a separate planar structure or formed as part of cam assembly 14. When formed as part of cam assembly 14 it would of course be constructed of the same material; however, if a separate member is utilized, it is preferred that it be composed of a soft resin impregnated with PTFE (which is also referred to by the tradename Teflon).

Figure 12F:
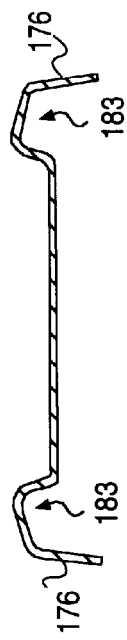
Figure 12E:
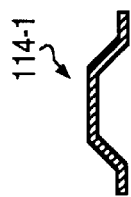
Figure 12C:
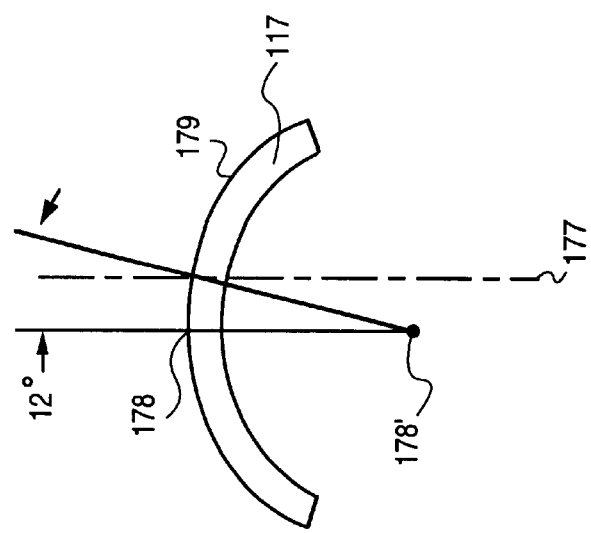
Figures 1, 12C:
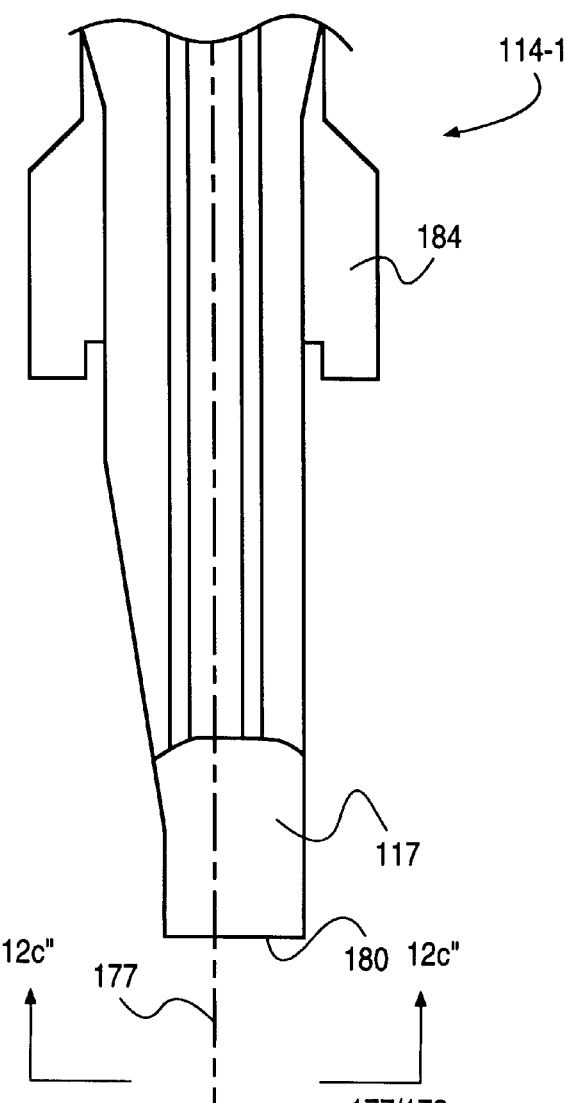
Figures 2, 12C:
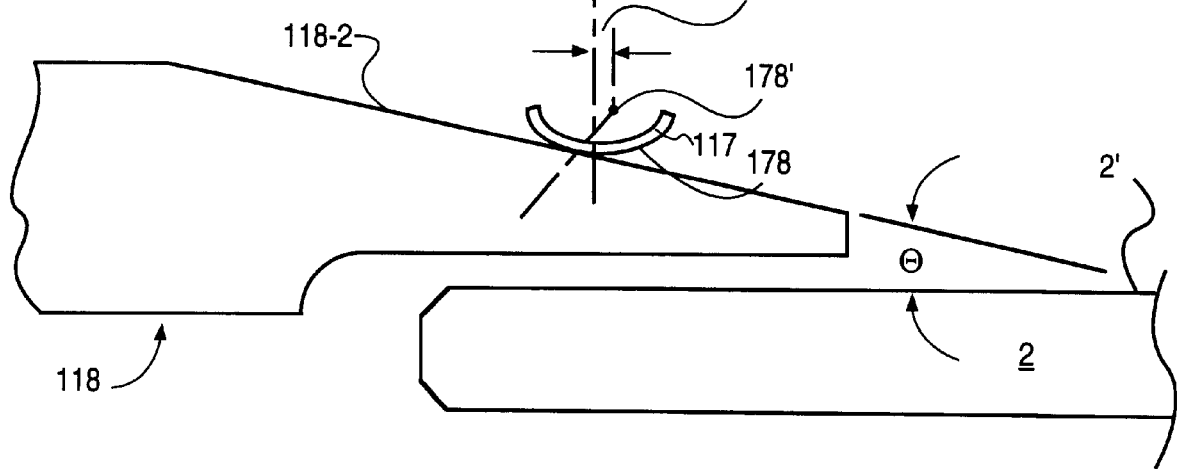

A second embodiment of the present invention is illustrated in FIGS. 12a–12f. A better appreciation of the construction of the load beam in accordance with the second embodiment of the present invention will be obtained by reference to FIGS. 12a–12j. Referring to FIG. 12a, load beam 114-1 is shown in plan view with the underside, that is the side on which the read/write recording transducer will be mounted, facing upward in this figure. Load beam 114-1 is referred to as the down load beam. Load beam 114-1 is unitary in construction and is preferably made from Type 302 non-magnetic stainless steel, having a thickness of approximately 0.0025 mm. As illustrated in FIG. 12a, load beam 114-1 includes lift tab 117 which is semicircular in cross section at its free end 180 as will be appreciated by reference to FIGS. 12c-1 and 12c-2. FIG. 12b illustrates load beam 114-1 in a side view taken along lines 12b—12b of FIG. 12a. In the view of FIG. 12b, the load beam 114-1 is shown in a flat and unloaded orientation. Tabs, denominated 176 are utilized to secure the electrical wiring which extends to the free end of the load beam for connection to the read/write transducer head to be mounted at that location. The cross-section of load beam 114-1 taken along lines 12e—12e is illustrated in FIG. 12e. The configuration of load beam 114-1 changes from a generally flat orientation (with the exception of tabs 166 and stiffening channels 183 along the outer edge of the load beam) as shown in FIG. 12f, the cross-section taken along lines 12f—12f, to the configuration illustrated in FIG. 12e, and near the free end of load beam 114-1 the lift tab 117 is generally semi-circular as is illustrated in FIG. 12c which shows the view of load beam 114-1 taken along the line 12c—12c in FIG. 12a. As will be appreciated by a reference to FIG. 12a, the center line of load beam 114-1 is at the position indicated by the dashed line denominated 177. It will also be appreciated by reference to FIG. 12a that the curved end portion of lift tab 117 is not symmetrical with respect to center line 177. This is also further illustrated in FIG. 12c where the center line of load beam 114-1 is indicated by dashed line denominated 177. The lowest point on lift tab 117 as measured from the center of radius 178' is indicated in FIG. 12c by reference line 178 which extends to the lower surface 179 of lift tab 117.

A better appreciation of the offset relationship between the free end of lift tab 117 and the centerline 177 of down load beam 114-1 will be obtained by reference to FIGS. 12c-1 and 12c-2. FIG. 12c-1 is a top plan view of down load 114-1 showing the end portion thereof and a portion of flexure 184. For simplicity, cam assembly 118 and disk 2 are not shown in FIG. 12c-1. In FIG. 12c-2, which is a view taken along 12c-2—12c-2, it will be appreciated that the centerline 177 of load beam 114-1 is to the left of the lowest point of tab lift 117 (indicated by 178) to provide an offset distance 177/178. The free end of lift tab 117 is offset toward the center of disk 2 to provide symmetrical lifting of load beam 114-1 as it contacts cam surface 118-2. In FIG. 12c-2 lift tab 117 is illustrated at the position where first contact is made with cam surface 118-2. The amount of the offset 177/178 is determined based on the angular slope θ, which is measured between cam surface 118-2 and surface 2' of disk 2, along with the radius of lift tab 117, the radius being measured from center of radius 178' and the lower surface 179. The lowest point of tab lift 117 is indicated at 178. The centerline offset may be calculated by the formula Centerline Offset=R sine θ where

θ=angle between disk surface and cam surface

R=radius of curvature of load tab contacting the cam surface

With this offset, the lifting force on load beam 114-1 will be applied symmetrically along the centerline of load beam 114-1. In the preferred embodiment, the angle θ is 12°, and the radius of lift tab 117 at the point of contact with cam surface 118-2 is 0.46mm. This results in offset 177/178 being 0.095 mm. Similarly, the up load beams have their tab ends offset, also toward the center of the disk, thereby ensuring that the first surface of the load tab to contact its corresponding cam surface does so along the center line of the load beam. This centerline contact eliminates any twisting forces on the load beam.

Figure 12D:
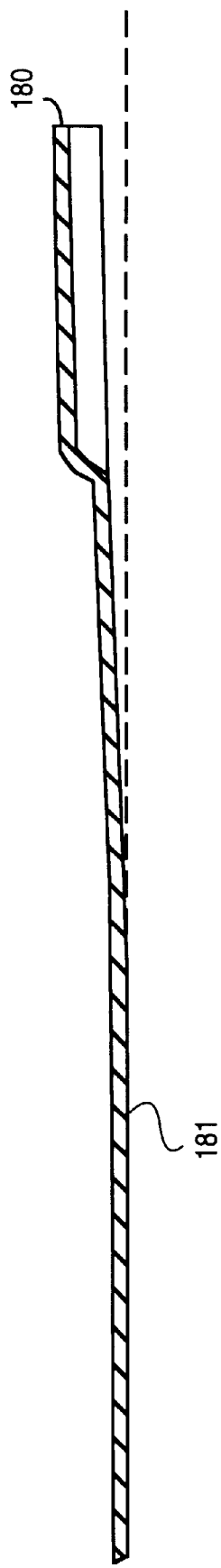
Figure 12J:
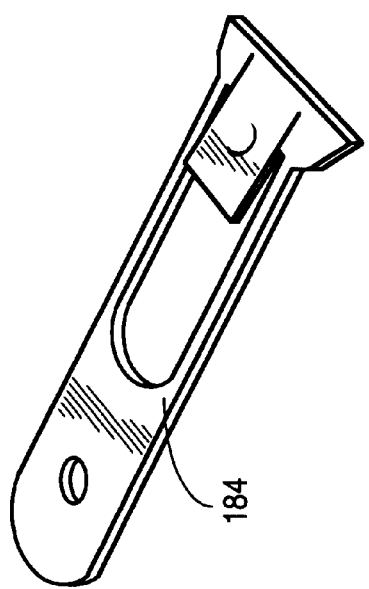
FIG. 12j is a perspective view of flexure 184.
Figure 12G:
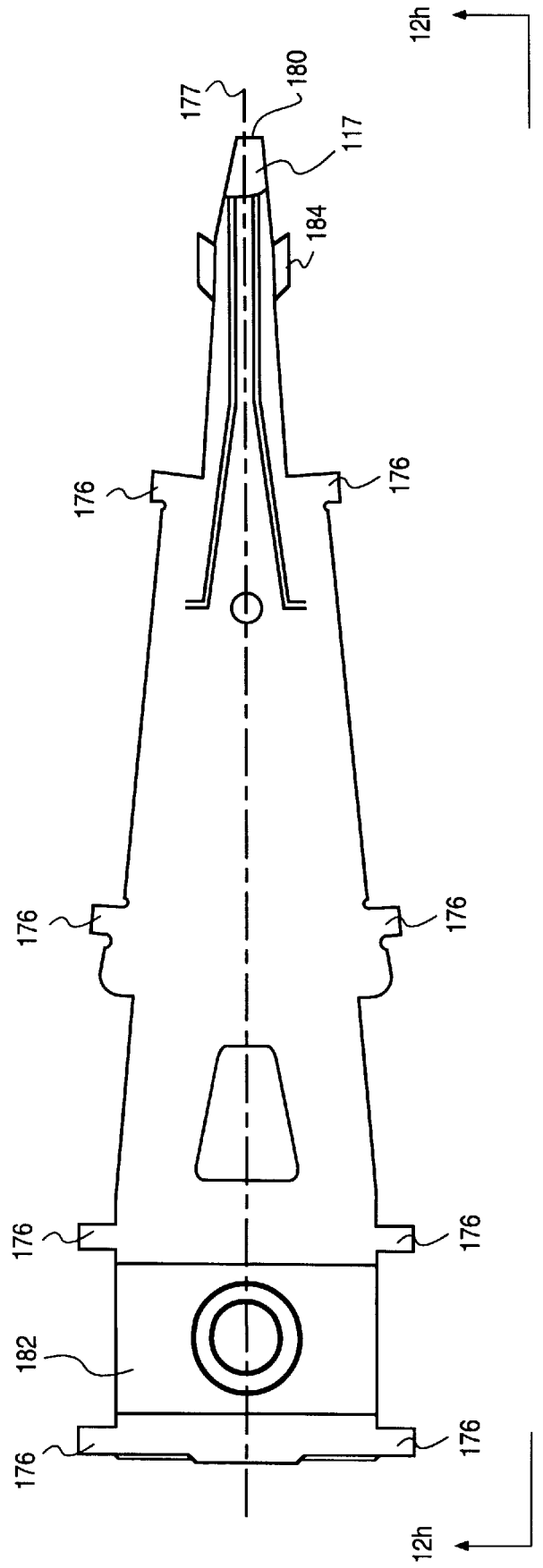
FIG. 12g is a top-plan view of a load beam used in the dynamic head-load version of drive in accordance with the present invention.

Referring to FIG. 12d, a cross-sectional view taken along the line 12d—12d of FIG. 12a, it will be appreciated that the free end 180 of load 117 is offset downwardly (with respect to the surface of the disk with which the load beam interfaces) from the plane of the flat surface of load beam 114-1 indicated by reference character 181 in FIG. 12d. This offset is provided to maximize the clearance between load beams when the read/write heads are unloaded. Referring to FIG. 12g, swage plate 182 is illustrated. Swage plate 182 is utilized in connecting the load beam to the actuator body. Also illustrated in FIG. 12g is flexure 184, only a portion of which is illustrated in this figure. Flexure 184 is utilized to support the read/write transducer head in a flexible manner below the underside of its respective load beam. A perspective view of flexure 184 is illustrated in FIG. 12j.

Figure 12H:
FIG. 12h is a view taken along lines 12h—12h in FIG. 12g showing the load beam in the loaded position.
Figure 12I:
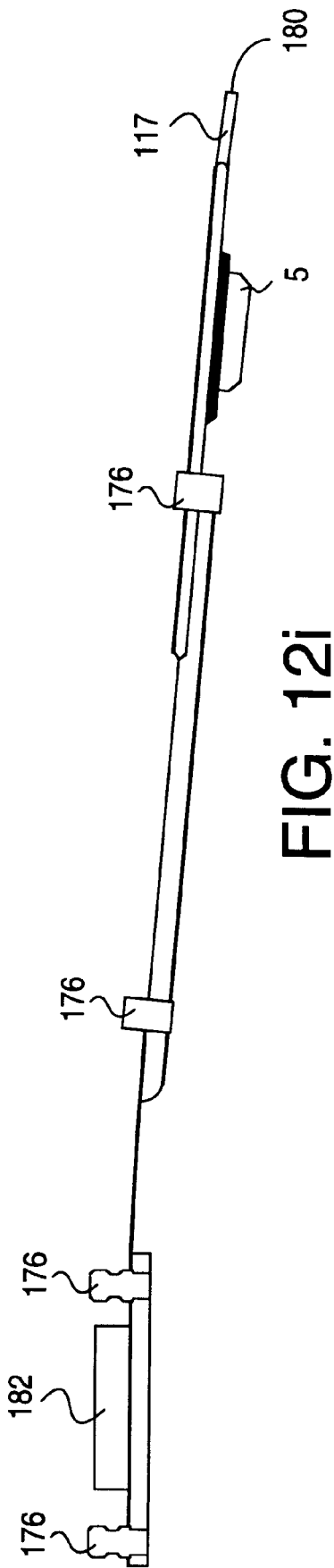
FIG. 12i illustrates the load beam in FIG. 12h, but in an unloaded position.

A side view of load beam 114-1 with its swage plate 182 is illustrated in FIG. 12h which is a view taken along the lines 12h—12h in FIG. 12g. In FIG. 12h the load beam, flexure and associated read/write transducer are illustrated in loaded position. FIG. 12i illustrates load beam 114-1 with associated read/write transducer and flexure in the unloaded position. As illustrated in FIG. 12i, there is a normal downward positioning of the free end of load beam 114-1 which is by bending load beam 114-1 to provide a predetermined pretensioning.

Figure 13:
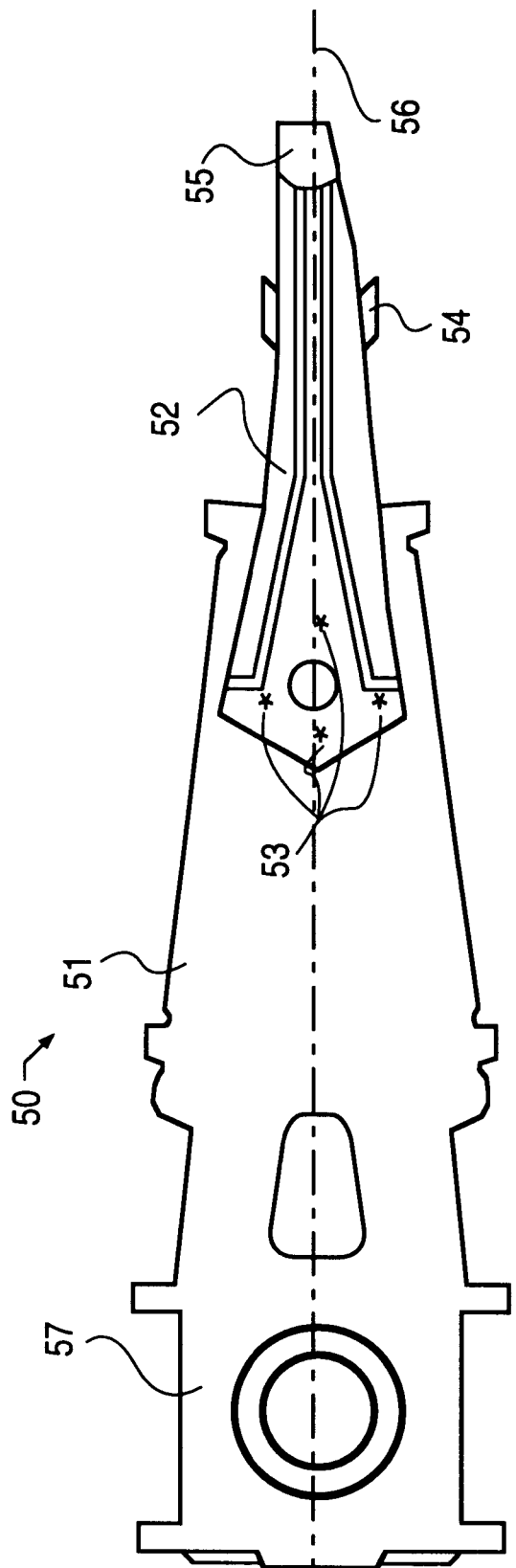
FIG. 13 illustrates is plan view a third embodiment of the present invention.

In accordance with a third embodiment of the present invention, the actuator arm, which is also referred to as a load beam, is constructed using a separate lift tab portion which is welded to a support arm portion, rather than providing the actuator arm load beam as a unitary structure, as in the case of the second embodiment described above in which load beam 114-1 is a unitary structure. Referring to FIG. 13, the actuator arm, referred to hereinafter is the load beam 50, is illustrated in a top plan view which shows the top side of load beam 50, which in the present invention is the down load beam. Load beam 50 includes support arm portion 51 and lift tab portion 52. Lift tab portion 52 is laser welded to the support arm portion, the laser weld spots being indicated at 53. A portion of the flexure (which is also laser welded to support arm portion 51) is illustrated at 54. The geometry of lift tab portion 52 is preferably substantially the same as the geometry of the lift tab portion of the unitary load beam 114-1 illustrated in FIG. 12a. More particularly, the end portion 55 of lift tab portion 52 is axially offset toward the center of the disk with respect to the centerline 56 of support arm portion 51. The relationship between end portion 55 and support arm portion 51 preferably the same as that illustrated in FIGS. 12c-1 and 12c-2. End 57 of support arm portion 51 is adapted for attachment to actuator body 6 of the rotary actuator used in the drive. The offset relationship for end portion 55 of lift tab portion 52 is preferable determined utilizing the same formula-relationships described above. With regard to the structural characteristics of load beam 50, support arm portion 51 may be constructed of the same material used and described above with respect to load beam 114-1. Lift tab portion 52 is preferable also constructed from the same material. Flexure 54, which is more fully illustrated in FIG. 14, is preferably constructed using the same material as flexure 184 (illustrated in FIG. 12j).

Figure 14:
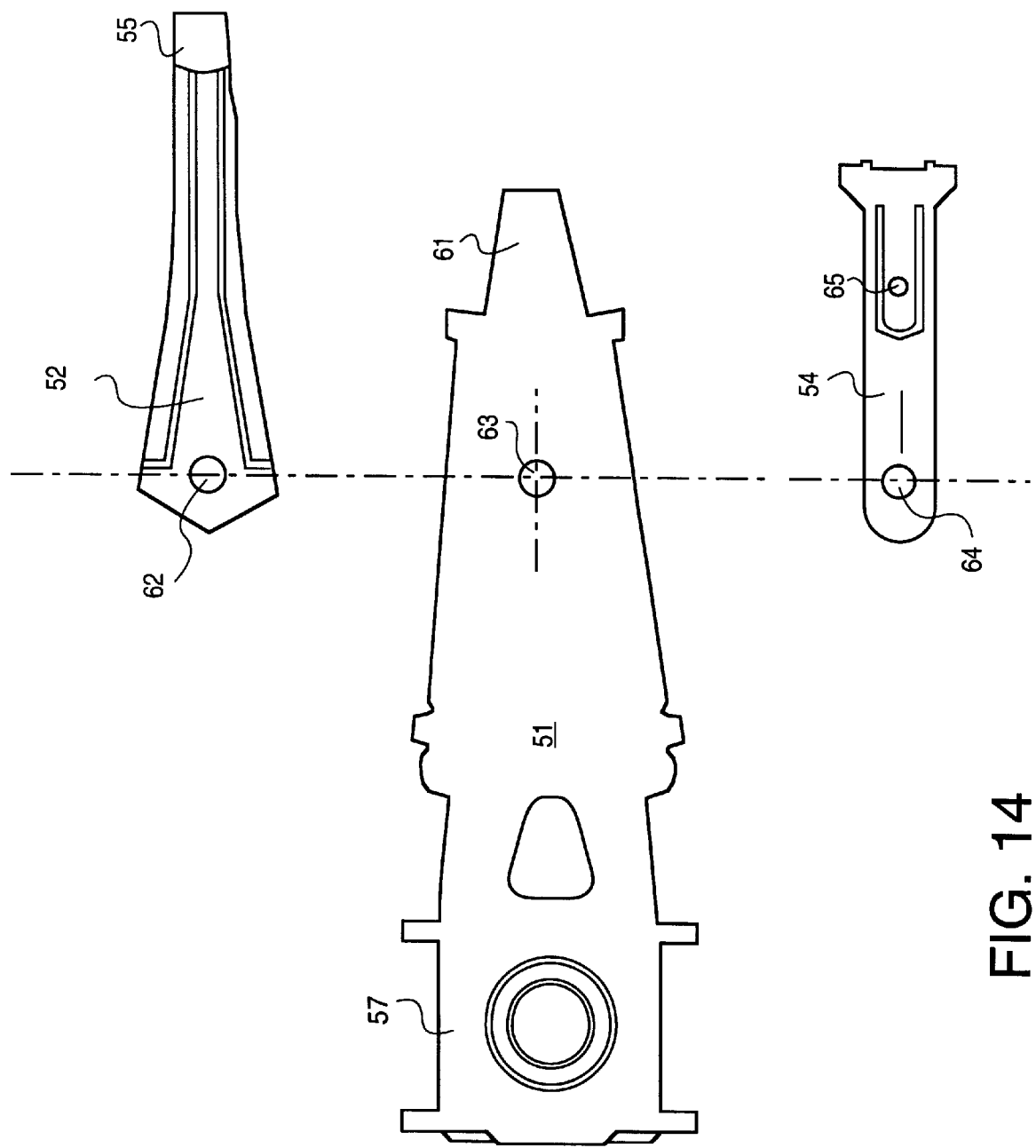
FIG. 14 illustrates in an exploded form major elements of the dynamic load beam in accordance with the third embodiment of the present invention.

Referring to FIG. 14, support arm portion 51 is illustrated in top plan view to disclose its complete structure, which cannot be fully seen in FIG. 13 because of lift tab portion 52 being welded in place. Support arm portion 51 includes tongue portion 61. As illustrated in FIG. 14, lift tab portion 52 includes alignment hole 62, support arm portion 51 includes alignment hole 63 and flexure 54 includes alignment hole 64.

Flexure 54 is welded in place on the underside of support arm 51 and lift tab portion 52 is welded in place on the top side (the side shown in FIG. 14) and during the assembly process alignment holes 62, 63 and 64 are utilized to position the parts in appropriate alignment. When welded in place, dimple portion 65 of flexure 54 is positioned beneath tongue portion 61 of support arm 51 and provides a gimbaling support for the slider body which is attached to the underside of the flexure 54. For ease of illustration, the slider body is not illustrated in these figures.

Figure 15:
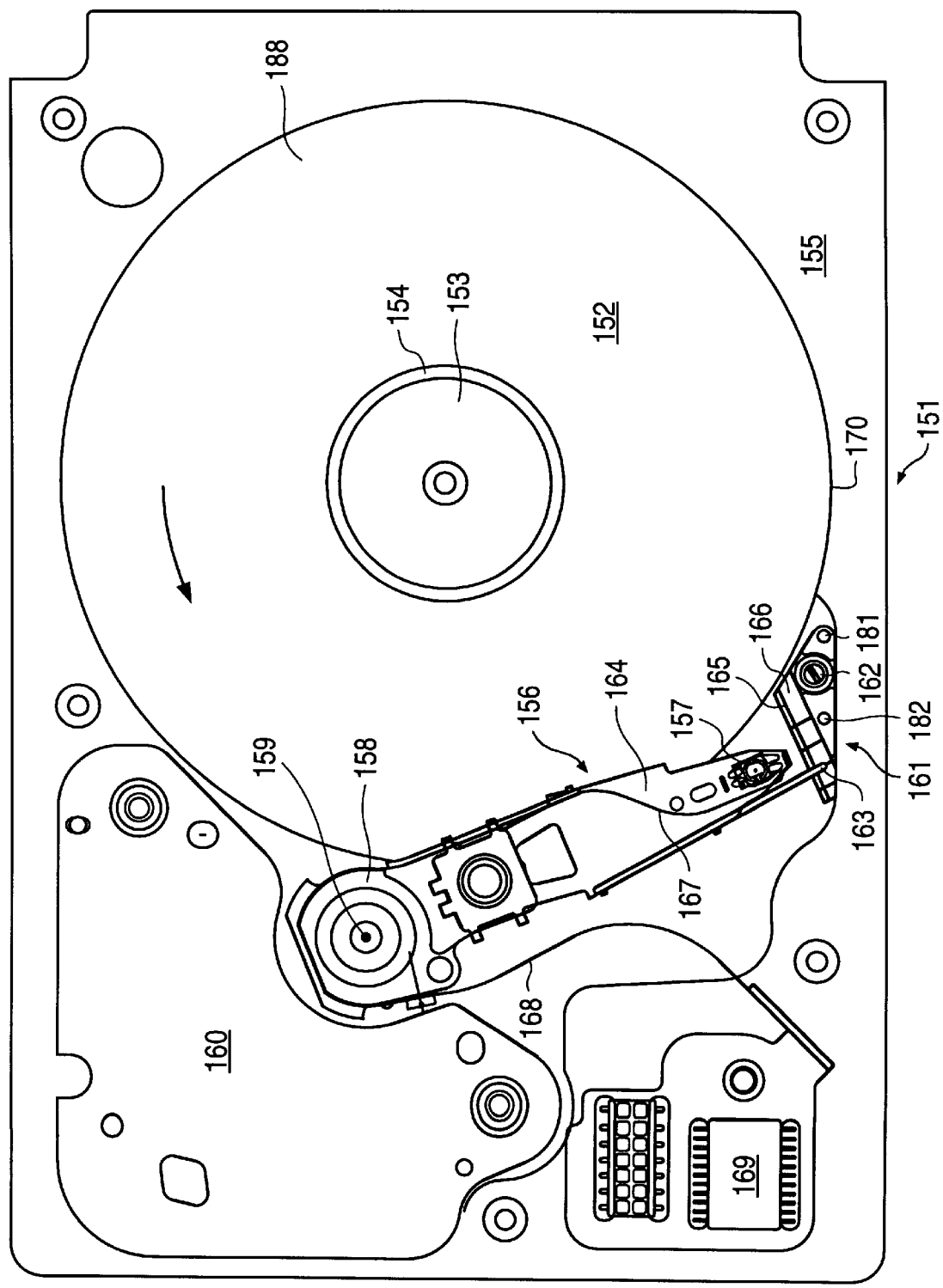
FIG. 15 is a top plan view of a disk drive in accordance with a fourth embodiment of the present invention.

A fourth embodiment of the present invention is shown in FIG. 15 in which disk drive 151 is illustrated in a top plan view. Disk drive 151 utilizes a rotary actuator which may be of a conventional type such as that illustrated in embodiments 1–3 above. In FIG. 15, disk drive 151 is illustrated with the top cover removed for the convenience of illustration of major components which are relevant to the present invention. Disk drive 151 includes-magnetic media 152 of the disk type which includes a surface for receiving and storing information of magnetically. Disks 152 and 152' are supported on spindle 153 which is driven by a spin motor (not shown). Upper clamp 154 is used to retain magnetic media 152 on spindle 153. Similarly, another clamp (not shown) is utilized to clamp magnetic media 152' to spindle 153. A clamp which may advantageously utilized in practice of the present invention may be one as described and claimed in U.S. patent application Ser. No. 07/765,358 filed Sep. 25, 1991 by James A. Dunckley, now U.S. Pat. No. 5,243,481, issued Sep. 7, 1993, which is incorporated herein by reference in its entirety. The spin motor is supported on baseplate 155 which may be made from any suitable rigid material, such as, for example 6061-T6 aluminum alloy which is preferably used. Alternatively, alloys of magnesium could be used.

Head gimbal assembly 156 (which will be described hereinafter in detail) supports air bearing slider 157 and upon rotation of the rotary actuator allows air bearing slider 157 to access tracks on magnetic media 152. Head gimbal assembly 156 is supported on actuator body 158, which is supported for rotation about a center of rotation 159. An actuator coil (not shown) is positioned beneath return plate 160 which forms a portion of the actuator drive motor for the rotary actuator. Rotary actuators suitable for use in driving head gimbal assembly 156 are well known to those skilled in the art and accordingly further description would only serve to unnecessarily lengthen this specification.

Dynamic loading and unloading of air bearing slider 157 is facilitated through the use of cam assembly 161 which is mounted and positioned on baseplate 155 by, among other things, a threaded bolt 162. As described in detail below, cam assembly 161 is positioned on baseplate 155 by projections 178 and 179, illustrated in FIGS. 19–21 and 23, which mate with apertures in baseplate 155. As pointed-out below, cam assembly 161 may be immovably secured to baseplate 155 prior to installing the disks. Accordingly, cam assembly 161 may be secured to baseplate 155 by a suitable adhesive instead of by bolt 162. Additionally, the cam assembly could be formed integrally with the baseplate. Lift tab 163 extends beyond the end of load beam 164, and lift tab 163 contacts and moves along the portion of cam surface indicated at 165 of the cam portion 166 of cam assembly 161. Cam assembly 161 is illustrated in extensive detail below.

Also illustrated in FIG. 15 is cable 167 which is connected at one end to the transducer element in air bearing slider 157 and at the other end is connected to flexible conductor 168. Flexible conductor 168 is utilized since it provides minimum restriction in the movement of head gimbal assembly 156, and therefore provides a convenient way of conducting signals from the transducer element of air bearing slider 157 to read/write preamp integrated circuit 169.

As will be appreciated by reference to FIG. 15, air bearing slider 157 is in a position such that it is unloaded from the surface 188 of magnetic media 152. Also illustrated in FIG. 15, head gimbal assembly 156 is in an unloaded, rest position. As will also be appreciated by reference to FIG. 15, no portion of cam assembly 161 extends over either surface 188 or surface 193 (FIG. 23) of magnetic media 152. It will be noted that the rightmost portion of cam assembly 161 is separated from outer edge 170 of magnetic media 152 by a gap. As will further be appreciated by reference to the figures which follow and the accompanying discussion, cam portion 166 includes a contour which permits rotation of head gimbal assembly 156 in the direction opposite that which used for loading air bearing slider 157 onto media 152, the additional movement permitting head gimbal assembly 156 to be moved sufficiently to allow installation of magnetic media 152 and 152' (FIG. 23) without interfering with the head gimbal assembly for any of the media. Although a portion of head gimbal assembly 156 does extend over the surface of media 152 when the head gimbal assembly is in the rest position, sufficient room is provided in disk drive 151 to allow rotation of the head gimbal assembly in a clockwise direction (as viewed in FIG. 15) to so that disks 152 and 152' may be installed after head gimbal assembly 156 has been secured in drive 151. Additionally, since no portion of cam assembly 161 extends within the area occupied by magnetic media 152 or 152', both head gimbal assembly 156 (and the head gimbal assemblies used for the other surfaces of the media) and cam assembly 161 may be installed in disk drive 151 prior to the installation of the magnetic disks. The two foregoing characteristics of the cam assembly 161 permits efficient assembly of disk drive 151, which may be accomplished for example by installing cam assembly 161 on baseplate 155; installing the actuator drive motor and head gimbal assembly; positioning head gimbal assembly to the left (as illustrated in FIG. 15) such that no part of head gimbal assemblies will be within the installation space of magnetic media 152 and 152'. In the illustrated, compact version of drive 151, this involves rotating the head gimbal assemblies to a position such that lift tabs 163 and 189 (FIG. 21) are to the left (as viewed in FIG. 15 and 16) of cam portion 166 and no longer are in contact with the cam surface. Therefore, after the disks have been installed the lift tabs must be re-loaded onto their respective cam surface. In view of this, trailing portion 185 includes rounded portions 203 and 204 (FIG. 21) to facilitate moving lift tabs 163 and 189 back into position on cam portion 176 after the media has been installed. Next, magnetic media 152 and 152' are positioned on spindle 153 and clamped into place. Using this process, it is no longer necessary to either move the cam assembly out of the way of a disk being installed or to carefully position a disk with respect to an already installed cam assembly in which a part of the cam assembly extends over a surface of the disks. After magnetic media 152 and 152' have been clamped into place, the head gimbal assembly 156 and the other head gimbal assemblies below head gimbal assembly 156 (and thus not visible in FIG. 15) are then rotated into the rest position as illustrated in FIG. 15.

Figure 16:
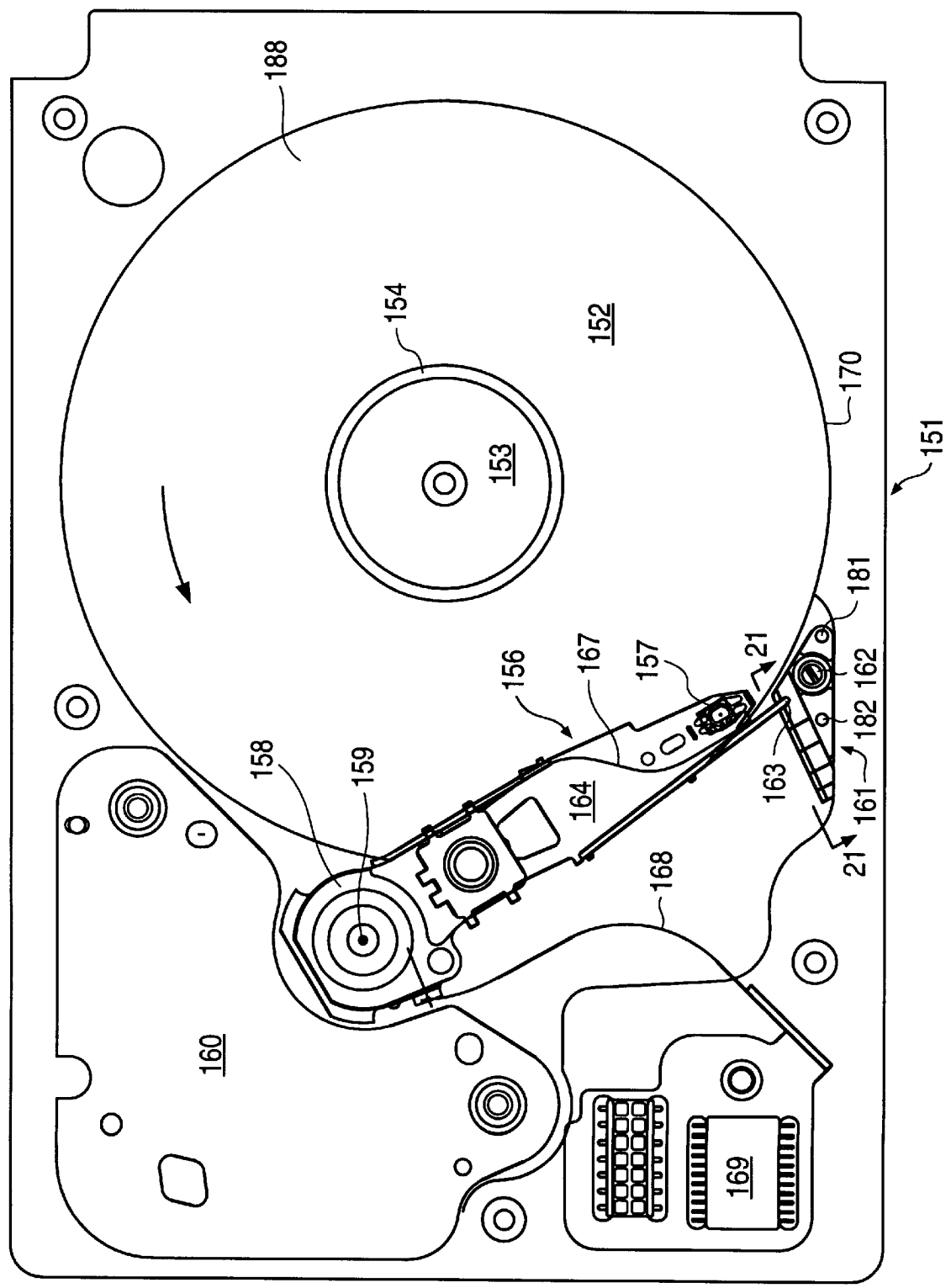
FIG. 16 is another top plan view described in accordance with the fourth embodiment of the present invention.

Referring to FIG. 16, disk drive 151 is illustrated in a view in which head gimbal assembly 156 has been rotated toward the center of magnetic media 152 and air bearing slider 157 has been moved into a loaded position above surface 188 of disk 152. At this position, lift tab 163 has been moved to near the right-most edge of cam surface 165, and as will be appreciated from the description which follows, is on downward slanted portion 187 (FIG. 21) of a cam surface 165.

In the views of both FIGS. 15 and 16, head gimbal assembly 156 denominated is a "down" head gimbal assembly since the read/write transducer (not shown) of air bearing slider 157 is facing downward with respect to surface 188 of magnetic media 152. Although not illustrated in FIGS. 15 or 16, "up" head gimbal assemblies are utilized to provide the recording and playback of information on lower surface 193 of magnetic media 152 and lower surface 2012 of magnetic media 152'. Down head gimbal assembly 156 is illustrated in greater detail in FIG. 17.

Figure 17:
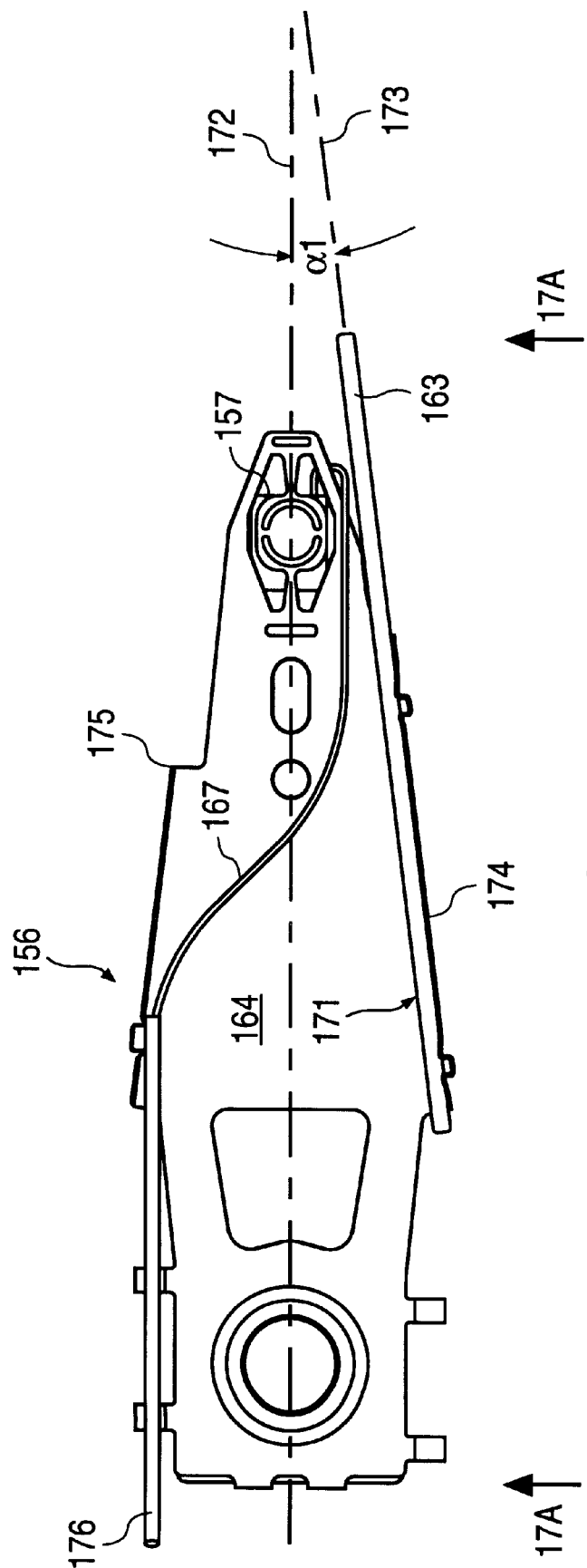
FIG. 17 is a top plan view of a down head gimbal assembly utilized in the present invention.
Figure 17A:
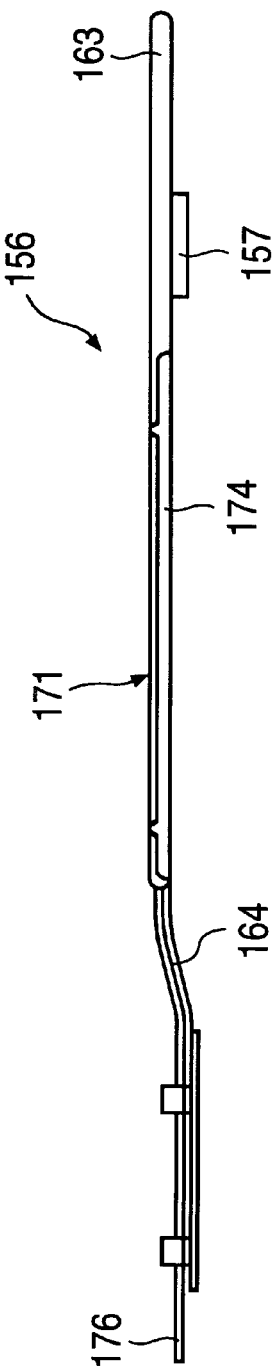
FIG. 17A is a view taken along the lines 17A—17A of FIG. 17.

FIG. 17 illustrates in an enlarged view head gimbal assembly 156 as shown from the top as illustrated in FIG. 15. Insulating cover 176 for cable 167 is illustrated in FIGS. 17 and 17A. As mentioned above, head gimbal assembly 156 is a down head gimbal assembly since the transducer of air bearing slider 157 is facing downward as viewed from the top of the disk drive 151. Load beam 164 is preferably of the low-profile type, and may be, for example, a type 16 available from Hutchinson Technology Incorporated, located in Hutchinson, Minn. In the preferred embodiment, lift tab 163 is provided by welding or gluing to the upper surface of load beam 164 lift rod 171, which may be for example non-magnetic stainless steel. A suitable adhesive for affixing lift rod 171 to load beam 164 is Ablestick 868-7. To reduce friction between lift tab 163 and the cam surface 165, the surface finish of lift rod 171 should by on the order of 8 micro inch finish. Lift rod 171 may be made from gauge 304W stainless steel hypodermic needle stock. It is, however, not essential that a rod be utilized to provide lift tab 163. Alternatively, load beam 164 could be modified to include an extension of the load beam material to the same area covered by a portion of rod 171 which extends beyond the parameter of load beam 164 as illustrated in FIG. 17 and provide a lift tab. With this alternative, the extension of the load beam material would preferably be formed into a cam follower, such as a semicircular portion, where the lift tab portion 163 contacts cam surface 165.

The centerline of load beam 164 is indicated by dashed line 172. The centerline of lift tab portion 163 is indicated by reference character 172, and as will be appreciated by reference to FIG. 17, there is angular displacement $\alpha 1$ between centerlines 172 and 173. When utilizing the Hutchinson Technology load beam it is convenient to attach rod 171 along the edge adjacent to the upturned flange 174 of load beam 164. This provides angle $\alpha 1$ as being approximately 6.6 degrees. This angle is not critical and the portion of lift tab 163 which contacts cam surface 165 could be parallel to centerline 172 of load beam 164. Angle $\alpha 1$ could be in the range of from 0 degrees to about 45 degrees.

Air bearing slider 157 may be of any suitable, generally available type, and it is up to the disk drive designer to select an air bearing slider suitable for the particular characteristics of the media being utilized. Suitable air bearing sliders may be purchased from companies such as SAE/KAIFA of Hong Kong, Read-Rite of Milpitas, Calif., or Applied Magnetic Corporation of Goleta, Calif. Air bearing slider 157 is attached to the gimbal portion of head gimbal assembly 156 by a structural epoxy resin, such as, for example, Ablestick 868-7.

Load beam 164 may be attached to actuator body 158 utilizing the techniques such as those disclosed earlier herein, for example by using a swage plate as illustrated and described in connection with FIGS. 12h and 12i.

Head gimbal assembly 156 includes a modification to the Hutchinson type 16 load beam. More particularly the portion of load beam 164 about centerline 172 for the Hutchinson type 16 are typically symmetrical, however to accommodate and provide additional room for the installation of disk, a portion of the Hutchinson load beam beginning at point 175 and extending toward centerline 172 has been cut away toward the end of load beam 164. Also, unnecessary wire tabs are removed from the side of load beam 164 which includes lift rod 171.

FIG. 17A illustrates a side view, taken along lines 17A—17A of FIG. 17, of head gimbal assembly 156. The "up" load beams (not shown since they are directly beneath the down load beam 156) are constructed in the same manner as head gimbal assembly 156, however of course the lift rod 171 is placed along the outer edge of the load beam and the slider is facing upward as viewed in FIG. 15 and the wires connected to the associated slider are re-routed.

Figure 18:
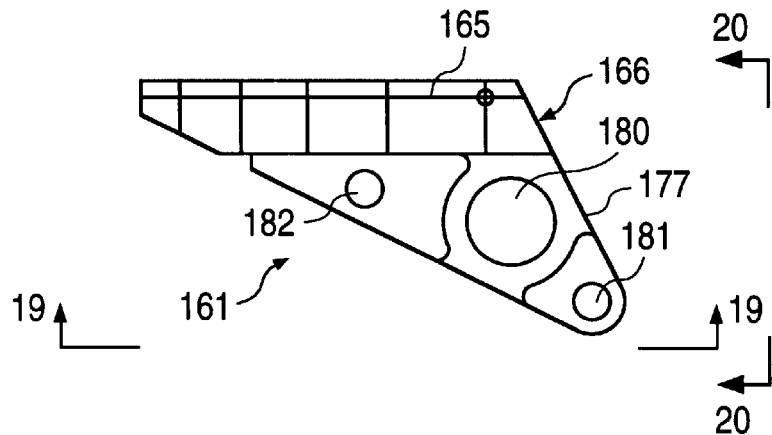
FIG. 18 is a top plan view of a cam assembly utilized in the fourth embodiment of the present invention.
Figure 21:
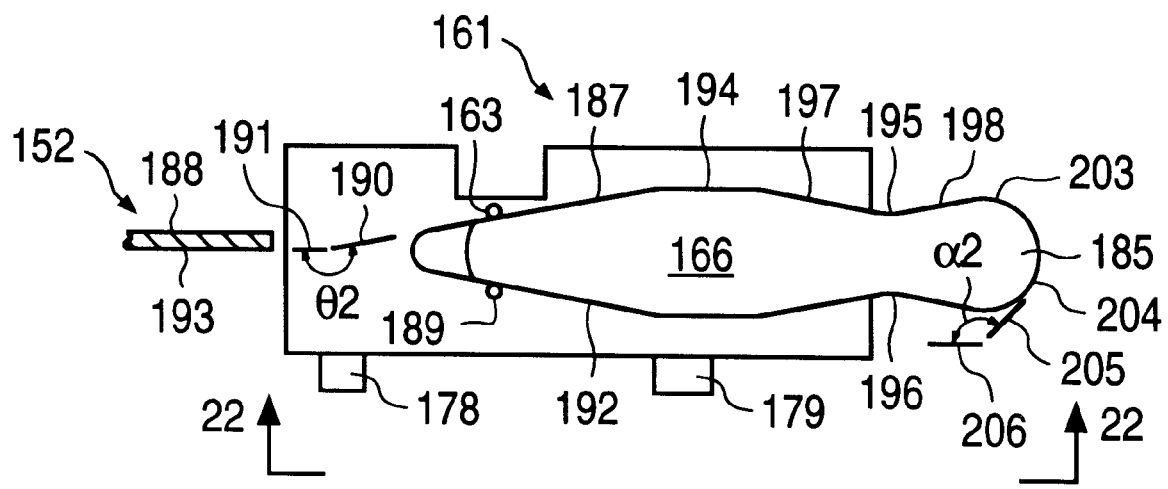
FIG. 21 is a view taken along the lines 21—21 showing the upper cam assembly and portion of the recording disk 152.
Figure 22:
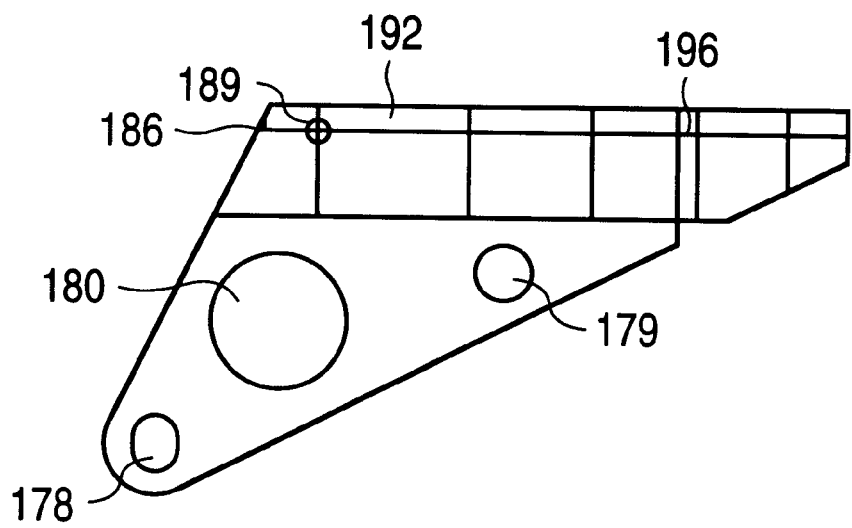
FIG. 22 is a view taken along the lines 22—22 of FIG. 21.
Figure 23:
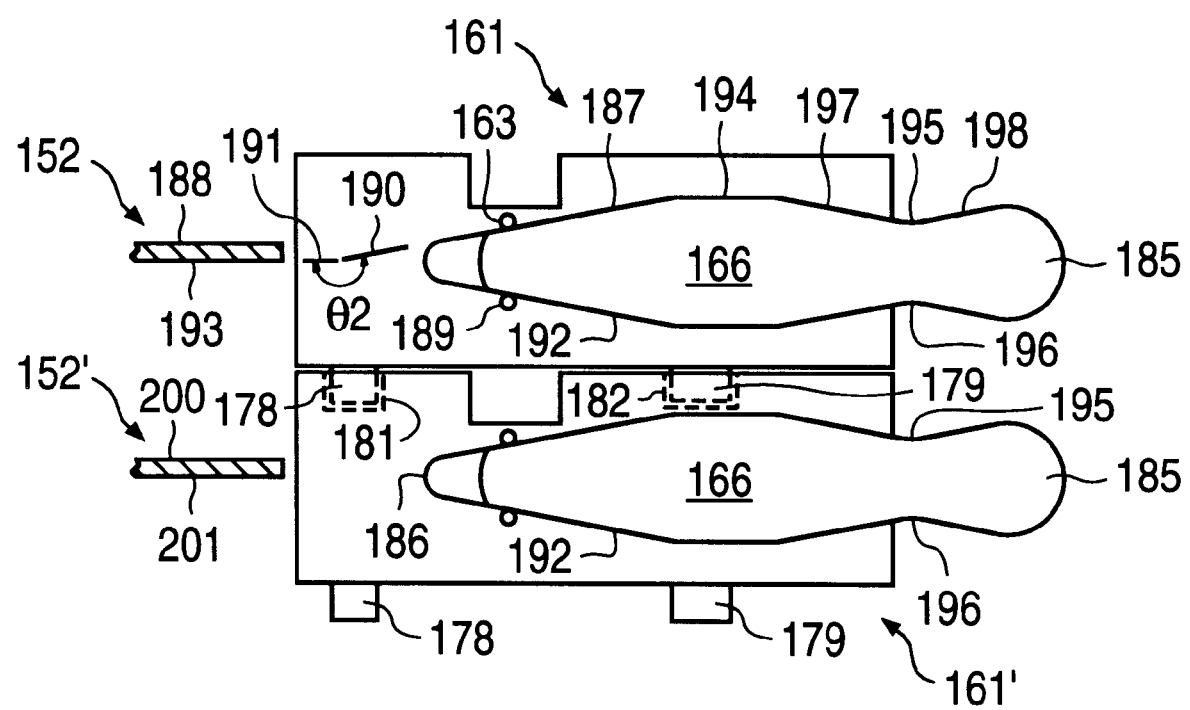
FIG. 23 is a view taken along the lines 21—21 of FIG. 16 showing the two disks utilized in disk drive 151 as well as upper and lower cam assemblies 161 in a stacked configuration.

A better-appreciation of cam assembly 161 will be gained by reference to FIGS. 18–22. FIG. 18 is an enlarged view of cam assembly 161 taken from the top as viewed in FIG. 15. Cam assembly 161 is preferably molded from a low friction material such as, for example, DuPont Delrin II 900F BK 602. As will be appreciated by reference to the explanation below, cam assembly 161 is produced as a modular unit which permits the utilization of several cam assemblies to provide cam surfaces for disk drive utilizing a plurality of disks. The utilization of two cam assemblies 161 in a stacked arrangement for magnetic media 152 and 152' is illustrated in FIG. 23.

Figure 19:
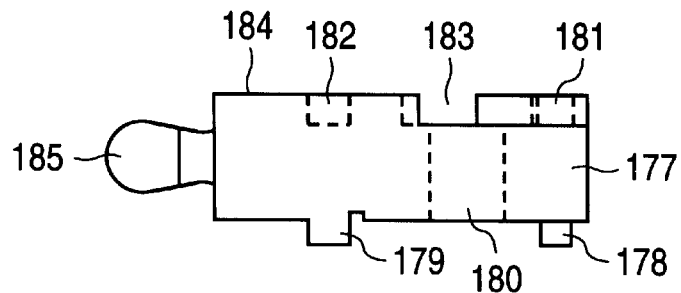
FIG. 19 is a view taken along the lines 19—19 of FIG. 18.

Cam assembly 161, although preferably molded as a unitary element, may be thought of functionally as having a cam portion 166 which extends from body portion 177. Body portion 177 includes projections 178 and 179 which extend from the lower portion of body 177 and fit into openings in baseplate 155 to correctly position cam assembly 161 with respect to head gimbal assembly 164 and magnetic disk 152. Returning to FIG. 17, opening 180 is provided in body portion 177 to permit installation of threaded bolt 162 to secure the cam assembly to baseplate 155. Additionally, apertures 181 and 182 extend from the top surface 184 of cam assembly 161 downward for a predetermined distance (as illustrated in FIG. 19). These apertures are sized such that they can receive projections 178 and 179 from a second cam assembly to provide stackability as indicated above.

Referring to FIG. 19, recessed area 183 is provided to permit the head of bolt 162 (FIG. 15) to be below top surface 184 of body portion 177. Also illustrated in FIG. 19 is the configuration of the trailing portion 185 of cam portion 166.

Figure 20:
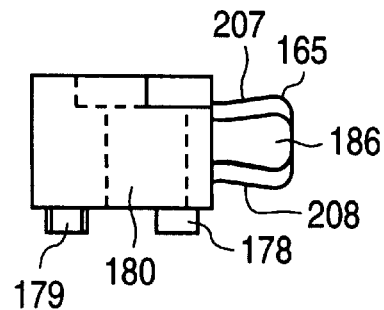
FIG. 20 is a view taken along the lines 20—20 of FIG. 18.

FIG. 20 is a view of cam assembly 161 taken along the lines 20—20 of FIG. 18. In FIG. 20 the leading portion 186 of cam portion 166 is illustrated, as is cam surface 165 along which lift tab 163 travels. Also in FIG. 20 it will be noted that projection 179 is oblong. This oblong shape is also illustrated in FIG. 22 which is a bottom view of cam assembly 161 taken along the lines 22—22 of FIG. 21. Although body portion 177 is illustrated as being rectangularly shaped, other shapes may be utilized. Body portion 177 serves to secure cam portion 166 to baseplate 155 and position cam portion at a location which is an appropriate height with respect to the surfaces of the associated media. In FIG. 20, it will be appreciated that the upper and lower surfaces of cam portion 166 extend toward the center of body 177 to provide a minimum contact surface for the lift tab, thereby reducing frictional forces. To reduce friction between the lift tabs 163 and 189 and their associated cam surfaces, relief surfaces 207 and 208, respectively, are formed on cam portion 166. The angle of relief surface 207 with respect to the surface 188 of media 152 should be greater than the angle of lift tab 163 with respect to surface 188. The same relationship holds true with respect to relief surface 208 and lift tab 189, both with respect to surface 193.

FIG. 21 is a view taken along lines 21—21 in FIG. 15 where for convenience only the upper magnetic media 152 and the upper cam assembly 161 are shown. Disk drive 151 is a two media version, however since the disk 152' and the head gimbal assemblies for the other surfaces extend directly below those shown in FIG. 15, they are not illustrated in the view of either FIG. 15 or 16. Turning to FIG. 21, lift tab 163 is illustrated in the position along loading surface portion 187 of cam surface 165 at which slider 157 is beginning to fly over the surface 188 of magnetic media 152. A second load tab 189 for the up head gimbal assembly is also illustrated. The angular relationship between loading surface portion 187 and the surface 188 of media 152 is indicated by θ2. Line portion 190 indicates the angular position of loading surface portion 187 and line portion 191 is parallel to surface 188 of media 152. Angle θ2 approximately 12 degrees in the preferred embodiment, however a typical acceptable range is from about 5 degrees to about 15 degrees. Similarly, the angular relationship between loading surface portion 192 on the lower side of cam portion 166 and lower surface 193 of media 152 would be in the same range. It will be noted from FIG. 21 that extending to the right as viewed in FIG. 21 that a flat portion 194 of cam surface 165 is provided, this flat portion 194 in this embodiment being generally parallel to surface 188 of disk 152. This flat portion ensures that air bearing slider 157 is completely removed from contact area portion of surface 188 before the head gimbal assembly is moved to the rest position as illustrated in FIG. 15. When the head gimbal assemblies are moved to the rest position, the respective lift tabs will be positioned at location 195 and 196 for the upper and lower head gimbal assemblies respectively. The angular relationship between the descending surface portion 197 with respect to surface 188 is preferably about 15 degrees, however an acceptable range for this angle is from about 5 to 25 degrees. The angular relationship between ascending portion 198 of the trailing portion 185 with respect to surface 188 is preferably 15 degrees, however this angle could range from about 5 to about 25 degrees. As described above, rounded portions 203 and 204 permit easy re-positioning of lift tabs 163 and 189 onto their associated portions of the cam surface. Line portion 205 indicates a tangential line with respect to rounded surface 204, and line portion 206 is parallel to surface 193 of disk 152. Angle α2, which provides an indication of the slope of rounded portion 204 with respect to surface 193, should be selected to be in the range of from about 0 degrees to about 60 degrees. The same angular relationship with respect to rounded portion 203 and surface 188 applies. The angular relationships with the corresponding portions along the lower surface of cam portion 166 would be the same with respect to lower surface=193 of media 152.

The underside of cam assembly 161 is viewed along lines 22—22 is illustrated in FIG. 22. It will be noted that the beginning of load position for lower load tab 189 is illustrated near the leading edge 186 of cam portion 166. Additionally, rest location 196 for the lower head gimbal assembly as illustrated.

Referring to FIG. 23, a stacked arrangement of cam assemblies 161 and 161' is illustrated. This view is a complete sectional view taken along the lines 21—21 of FIG. 16 to illustrate disk 152' and second cam assembly unit 161 which are utilized in the disk drive 151 having a pair of disks. For convenience of reference, the reference characters for lower cam assembly 161' utilize corresponding numbers to those for cam assembly 161. Referring to FIG. 23, it will be noted that projections 178 and 179 interfit with openings 182 and 181 respectively to interlock upper cam assembly 161 with lower cam assembly 161. Lower projections 178 and 179 interfit with corresponding openings in baseplate 155 to position both the upper and lower cam assemblies at the appropriate location with regard to the head gimbal assemblies and disks 152 and 152'.

Those skilled in the art will of course appreciate that the various modifications may be made to our invention without departing from the spirit and scope thereof and that the foregoing description is illustrative of several embodiments of our invention, however the scope of our invention is governed by the appended claims.

We claim:

1. A method of manufacturing a rigid disk drive comprising the steps of:
    (a) providing a baseplate;
    (b) providing a rigid disk and supporting said rigid disk for rotation on said baseplate;
    (c) providing an elongated actuator arm comprising a load beam and pivotally supporting said actuator arm for rotation about a center of rotation on said baseplate;
    (d) providing an end of said load beam with a lift tab extending along an axis which is displaced with respect to a centerline of said load beam;
    (e) providing a read/write recording element and supporting said read/write recording element by said load beam at a position intermediate said center of rotation and said lift tab; and
    (f) providing a cam assembly comprising a cam surface and locating said cam assembly on said baseplate at a position adjacent to an edge of said disk and in a location in which said lift tab can contact said cam surface.

2. The method according to claim 1, further comprising the step of:
    (g) placing said lift tab in contact with a portion of said cam surface.

3. The method according to claim 2, further comprising the steps of:
    rotating said rigid disk; and
    rotating said elongated actuator arm to move said lift tab out of contact with said cam surface.

4. The method according to claim 2, wherein after step (g) the method further comprises the step of:
    (h) rotating said elongated actuator arm to move said lift tab out of contact with said cam surface and to a position wherein said read/write recording element is in an operative relationship with a surface of said rigid disk.

5. The method according to claim 4, wherein prior to step (h) the method comprises the step of:

rotating said rigid disk.

6. The method according to claim 1, wherein step (f) further comprises the step of providing said cam surface with a contour which permits rotation of said elongated actuator arm in a direction and in an amount sufficient to permit in step (b) installation of said rigid disk on said baseplate without interference with said elongated actuator arm.

7. The method according to claim 1, wherein step (d) further comprises providing said lift tab with a curvilinear portion at a location at which said lift tab can contact said cam surface.

8. The method according to claim 1, wherein step (d) further comprises providing said lift tab with a semicircular portion at a location at which said lift tab can contact said cam surface.

9. The method according to claim 1 wherein in step (c) said load beam is constructed by the steps of:

providing a support arm portion having a first end supported for rotation about said center of rotation;

providing a lift tab portion and attaching a first end of said lift tab portion to said first end of said support arm portion;

providing said lift tab portion with a second end which extends beyond said first end of said support arm portion, providing on said lift tab portion a lift tab contact portion having a centerline which is displaced with respect to a centerline of said load beam.

10. The method according to any of claims 1–9, wherein step (d) further comprises positioning said lift tab such that an axis of said lift tab is skewed with respect to a centerline of said load beam.

11. The method according to any of claims 1–6, wherein the step of providing a lift tab further comprises providing a cylindrical lift tab.

12. The method according to any of claims 1–9, wherein step (d) further comprises positioning said lift tab such that a centerline of said lift tab is offset from said centerline of said load beam.

13. The method according to claim 12, wherein the step of positioning said lift tab such that a centerline of said lift tab is offset from said centerline of said load beam further comprises providing said offset in a direction parallel to a surface of said rigid disk.

14. The method according to any of claims 1–9, wherein step (d) further comprises positioning said lift tab such that a centerline of said lift tab is parallel to and offset from centerline of said load beam.

15. The method according to claim 1, wherein the step of providing a cam assembly further comprises providing a cam assembly which is removably supported on said baseplate.

16. The method according to claim 1, wherein the step of providing a cam assembly on said baseplate further comprises providing a cam assembly which is positionable at a plurality of locations.

17. The method according to claim 1, wherein the step of providing a cam assembly comprising a cam surface further comprises constructing said cam surface such that one portion of said cam surface terminates at a first location adjacent to a surface of said disk and further such that another portion of said cam surface terminates at a second location, the method further comprising the steps of:

positioning said elongated actuator arm at a location such that said lift tab is adjacent to said second location; and moving said elongated actuator arm by an amount sufficient to position said lift tab on said cam surface.

18. The method according to claim 17, wherein step (f) further comprises the step of providing a detent on said cam surface, and wherein the step of moving said elongated actuator arm by an amount sufficient to position said lift tab on said cam surface comprises positioning said lift tab at said detent.

19. The method according to claim 17, further comprising the step of:

rotating said elongated actuator arm by an amount sufficient to move said lift tab out of contact with said cam surface.

20. The method according to claim 19, wherein said method further comprises the step of rotating said disk, and wherein the step of rotating said elongated actuator arm by an amount sufficient to move said lift tab out of contact with said cam surface comprises moving said actuator by an amount sufficient to position said read/write recording element in an operative relationship with a surface of said rigid disk while said disk is rotating.

21. The method according to claim 20, wherein step (f) further comprises the step of providing a detent on said cam surface.

22. The method according to claim 1, wherein step (f) further comprises the step of providing a detent on said cam surface.

23. The method according to claim 1, further comprising the steps of:

providing another elongated actuator arm comprising a load beam and pivotally supporting said another actuator arm for rotation about said center of rotation;

providing an end of said another load beam with a lift tab extending along an axis which is displaced with respect to a centerline of said another load beam;

providing another read/write recording element and supporting said another read/write recording element by said another load beam at a position intermediate said center of rotation and said lift tab; and providing on said cam assembly another cam surface in a location in which said lift tab of said another load beam can contact said another cam surface.

24. The method according to claim 23, further comprising the steps of providing a detent on said cam surface and providing another detent on said another cam surface.

25. The method according to claim 23, wherein the steps of providing said cam surface and providing said another cam surface further comprises the steps of:

constructing said cam surface such that a first portion of said cam surface terminates at a first location adjacent to a surface of said disk and a second portion of said cam surface terminates at a second location displaced from said first location, constructing said another cam surface such that one portion of said another cam surface terminates at a third location adjacent to another surface of said disk and another portion of said another surface terminates at a location displaced from said third location, the method further comprising the steps of:

positioning said elongated actuator arm at a location such that said lift tab is adjacent to said second location, and moving said elongated actuator arm by an amount sufficient to position said lift tab on said cam surface; and positioning said another elongated actuator arm at a location such that the associated lift tab is adjacent to said third location, and moving said another elongated actuator arm by an amount sufficient to position the associated lift tab on said another cam surface.

26. The method according to claim 23, further comprising the step of:

placing said lift tab and said another lift tab in contact with a portion of their associated cam surfaces.

27. The method according to claim 26, further comprising the step of:

providing a planar plate and positioning said planar plate such that said plate is between said read/write recording element and said another read/write recording element in a location adjacent to an edge of said disk.

28. The method according to claim 26, further comprising the steps of:

rotating said elongated actuator arm and rotating said another elongated actuator arm to move their associated lift tabs out of contact with their associated cam surfaces and to a position wherein said read/write recording element is positioned in an operative relationship with one surface of said rigid disk, and wherein said another read/write recording element is positioned in an operative relationship with another surface of said rigid disk.

29. The method according to claim 28, wherein the step of rotating said rigid disk is performed prior to positioning said read/write recording element and said another read/write recording element in operative relationship with their respective disk surfaces, and further wherein the positioning of said read/write recording element and said another read/write recording element is performed while said disk is rotating.

30. A method of manufacturing a rigid disk drive comprising the steps of:

(a) providing a baseplate;

(b) providing a rigid disk and supporting said rigid disk for rotation on said baseplate;

(c) providing an elongated actuator arm comprising a load beam and pivotally supporting said actuator arm for rotation about a center of rotation on said baseplate;

(d) providing an end of said load beam with a lift tab;

(e) providing a read/write recording element and supporting said read/write recording element by said load beam at a position intermediate said center of rotation and said lift tab;

(f) providing a cam assembly comprising a cam surface and locating said cam assembly on said baseplate at a position adjacent to an edge of said disk in a location in which said lift tab can contact said cam surface; and (g) providing on said cam surface a first raised lobe, a second raised lobe and a detent disposed therebetween.

31. The method according to claim 30, further comprising the step of:

(h) placing said lift tab in contact with a portion of said cam surface.

32. The method according to claim 31, further comprising the steps of:

rotating said rigid disk; and rotating said elongated actuator arm to move said lift tab out of contact with said cam surface.

33. The method according to claim 31, wherein after step (h) the method further comprises the step of:

(i) rotating said elongated actuator arm to move said lift tab out of contact with said cam surface and to a position wherein said read/write recording element is in an operative relationship with a surface of said rigid disk.

34. The method according to claim 33, wherein prior to step (i) the method comprises the step of:

rotating said rigid disk.

35. The method according to claim 30, wherein step (f) further comprises the step of providing said cam surface with a contour which permits rotation of said elongated actuator arm in a direction and in an amount sufficient to permit in step (b) installation of said rigid disk without interference with said elongated actuator arm.

36. the method according to any of claims 30–35, wherein the step of providing a lift tab further comprises providing a cylindrical lift tab.

37. The method according to claim 30, wherein step (d) further comprises providing said lift tab with a curvilinear portion at a location at which said lift tab can contact said cam surface.

38. The method according to claim 30, wherein step (d) further comprises providing said lift tab with a semicircular portion at a location at which said lift tab can contact said cam surface.

39. The method according to claim 30, wherein in step (c) said load beam is constructed by the steps of:

providing a support arm portion having a first end supported for rotation about said center of rotation;

providing a lift tab portion and attaching a first end of said lift tab portion to said first end of said support arm portion;

providing said lift tab portion with a second end which extends beyond said first end of said support arm portion, providing on said lift tab portion a lift tab contact portion.

40. The method according to claim 30, wherein the step of providing a cam assembly further comprises providing a cam assembly which is removably supported on said baseplate.

41. The method according to claim 30, wherein the step of providing a cam assembly on said baseplate further comprises providing a cam assembly which is positionable at a plurality of locations.

42. The method according to claim 30, wherein the step of providing a cam assembly comprising a cam surface further comprises constructing said cam surface such that one portion of said cam surface terminates at a first location adjacent to a surface of said disk and further such that another portion of said cam surface terminates at a second location, the method further comprising the steps of:

positioning said elongated actuator arm at a location such that said lift tab is adjacent to said second location; and moving said elongated actuator arm by an amount sufficient to position said lift tab on said cam surface.

43. The method according to claim 42, wherein the step of moving said elongated actuator arm by an amount sufficient to position said lift tab on said cam surface comprises positioning said lift tab at said detent.

44. The method according to claim 42, further comprising the step of:

rotating said elongated actuator arm by an amount sufficient to move said lift tab out of contact with said cam surface.

45. The method according to claim 44, wherein said method further comprises the step of rotating said disk, and wherein the step of rotating said elongated actuator arm by an amount sufficient to move said lift tab out of contact with said cam surface comprises moving said actuator by an amount sufficient to position said read/write recording element in an operative relationship with a surface of said rigid disk while said disk is rotating.

46. The method according to claim 30, further comprising the steps of:

providing another elongated actuator arm comprising a load beam and pivotally supporting said another actuator arm for rotation about said center of rotation;

providing an end of said another load beam with a lift tab;

providing another read/write recording element and supporting said another read/write recording element by said another load beam at a position intermediate said center of rotation and said lift tab of said another load beam;

providing on said cam assembly another cam surface in a location in which said lift tab of said another load beam can contact said another cam surface; and providing a detent position on said another cam surface.

47. The method according to claim 46, wherein the steps of providing said cam surface and providing said another cam surface further comprises the steps of:

constructing said cam surface such that a first portion of said cam surface terminates at a first location adjacent to a surface of said disk and a second portion of said cam surface terminates at a second location displaced from said first location, constructing said another cam surface such that one portion of said another cam surface terminates at a third location adjacent to another surface of said disk and another portion of said another surface terminates at a location displaced from said third location, the method further comprising the steps of:

positioning said elongated actuator arm at a location such that said lift tab is adjacent to said second location, and moving said elongated actuator arm by an amount sufficient to position said lift tab on said cam surface; and positioning said another elongated actuator arm at a location such that the associated lift tab is adjacent to said third location, and moving said another elongated actuator arm by an amount sufficient to position the associated lift tab on said another cam surface.

48. The method according to claim 46, further comprising the step of:

placing said lift tab and said another lift tab in contact with a portion of their associated cam surfaces.

49. The method according to claim 48, further comprising the step of:

providing a planar plate and positioning said planar plate such that said plate is between said read/write recording element and said another read/write recording element in a location adjacent to an edge of said disk.

50. The method according to claim 48, further comprising the steps of:

rotating said elongated actuator arm and rotating said another elongated actuator arm to move their associated lift tabs out of contact with their associated cam surfaces and to a position wherein said read/write recording element is positioned in an operative relationship with one surface of said rigid disk, and wherein said another read/write recording element is positioned in an operative relationship with another surface of said rigid disk.

51. The method according to claim 50, wherein the step of rotating said rigid disk is performed prior to positioning said read/write recording element and said another read/write recording element in operative relationship with their respective disk surfaces, and further wherein the positioning of said read/write recording element and said another read/write recording element is performed while said disk is rotating.

52. A method of manufacturing a rigid disk drive comprising the steps of:

(a) providing a baseplate;

(b) providing a rigid disk and supporting said rigid disk for rotation on said baseplate;

(c) providing an elongated actuator arm comprising a load beam and pivotally supporting said actuator arm for rotation about a center of rotation on said baseplate;

(d) providing an end of said load beam with a lift tab, and providing a portion of said lift tab with a cylindrical shape;

(e) providing a read/write recording element and supporting said read/write recording element by said load beam at a position intermediate said center of rotation and said lift tab; and (f) providing a cam assembly comprising a cam surface and locating said cam assembly on said baseplate at a position adjacent to an edge of said disk and in a location in which said cylindrical shaped portion of said lift tab can contact said cam surface.

53. The method according to claim 52, further comprising the step of:

(g) placing at least a portion of said cylindrically shaped portion of said lift tab in contact with a portion of said cam surface.

54. The method according to claim 53, further comprising the steps of:

rotating said rigid disk; and rotating said elongated actuator arm to move said lift tab out of contact with said cam surface.

55. The method according to claim 53, wherein after step (g) the method further comprises the step of:

(h) rotating said elongated actuator arm to move said lift tab out of contact with said cam surface and to a position wherein said read/write recording element is in an operative relationship with a surface of said rigid disk.

56. The method according to claim 55, wherein prior to step (h) the method comprises the step of:

rotating said rigid disk.

57. The method according to claim 52, wherein step (f) further comprises the step of providing said cam surface with a contour which permits rotation of said elongated actuator arm in a direction and in an amount sufficient to permit in step (b) installation of said rigid disk without interference with said elongated actuator arm.

58. The method according to claim 52, wherein in step (c) said load beam is constructed by the steps of:

providing a support arm portion having a first end supported for rotation about said center of rotation;

providing a lift tab portion having a first and a second end, and attaching said first end of said lift tab portion to said first end of said support arm portion such that said second end extends beyond said first end of said support arm portion;

providing on said lift tab portion a lift tab for contacting a portion of said cam surface.

59. The method according to claim 52, wherein the step of providing a cam assembly further comprises providing a cam assembly which is removably supported on said baseplate.

60. The method according to claim 52, wherein the step of providing a cam assembly on said baseplate further comprises providing a cam assembly which is positionable at a plurality of locations.

61. The method according to claim 52, wherein the step of providing a cam assembly comprising a cam surface further comprises constructing said cam surface such that one portion of said cam surface terminates at a first location adjacent to a surface of said disk and further such that another portion of said cam surface terminates at a second location, the method further comprising the steps of:

positioning said elongated actuator arm at a location such that said lift tab is adjacent to said second location; and moving said elongated actuator arm by an amount sufficient to position at least a portion of said cylindrically shaped portion of said lift tab in contact with a portion of said cam surface.

62. The method according to claim 61, wherein step (f) further comprises the step of providing a detent on said cam surface, and wherein the step of moving said elongated actuator arm by an amount sufficient to position at least a portion of said cylindrically shaped portion of said lift tab in contact with a portion of said cam surface comprises positioning said lift tab at said detent.

63. The method according to claim 61, further comprising the step of:

rotating said elongated actuator arm by an amount sufficient to move said lift tab out of contact with said cam surface.

64. The method according to claim 63, wherein said method further comprises the step of rotating said disk, and wherein the step of rotating said elongated actuator arm by an amount sufficient to move said lift tab out of contact with said cam surface comprises moving said actuator by an amount sufficient to position said read/write recording element in an operative relationship with a surface of said rigid disk while said disk is rotating.

65. The method according to claim 64, wherein step (f) further comprises the step of providing a detent position on said cam surface.

66. The method according to claim 52, wherein step (f) further comprises the step of providing on said cam surface a first raised lobe, a second raised lobe and a detent disposed therebetween.

67. The method according to claim 52, further comprising the steps of:

providing another elongated actuator arm comprising a load beam and pivotally supporting said another actuator arm for rotation about said center of rotation;

providing an end of said another load beam with another lift tab, and providing a portion of said another lift tab with a curvilinear shape;

providing another read/write recording element and supporting said another read/write recording element by said another load beam at a position intermediate said center of rotation and said lift tab; and providing on said cam assembly another cam surface in a location in which said curvilinear shaped portion of said lift tab of said another beam can contact said another cam surface.

68. The method according to claim 67, further comprising the steps of providing a detent position on said cam surface and providing another detent position on said another cam surface.

69. The method according to claim 67, wherein the steps of providing said cam surface and providing said another cam surface further comprises the steps of:

constructing said cam surface such that a first portion of said cam surface terminates at a first location adjacent to a surface of said disk and a second portion of said cam surface terminates at a second location displaced from said first location, constructing said another cam surface such that one portion of said another cam surface terminates at a third location adjacent to another surface of said disk and another portion of said another surface terminates at a location displaced from said third location, the method further comprising the steps of:

positioning said elongated actuator arm at a location such that said lift tab is adjacent to said second location, and moving said elongated actuator arm by an amount sufficient to position at least a portion of said cylindrical portion of said lift tab in contact with a portion of said cam surface; and positioning said another elongated actuator arm at a location such that the associated lift tab is adjacent to said third location, and moving said another elongated actuator arm by an amount sufficient to position at least a portion of the curvilinear portion of the associated lift tab in contact with a portion of said another cam surface.

70. The method according to claim 67, further comprising the step of:

placing said lift tab and said another lift tab in contact with a portion of their associated cam surfaces.

71. The method according to claim 70, further comprising the step of:

providing a planar plate and positioning said planar plate such that said plate is between said read/write recording element and said another read/write recording element in a location adjacent to an edge of said disk.

72. The method according to claim 70, further comprising the steps of:

rotating said elongated actuator arm and rotating said another elongated actuator arm to move their associated lift tabs out of contact with their associated cam surfaces and to a position wherein said read/write recording element is positioned in an operative relationship with one surface of said rigid disk, and wherein said another read/write recording element is positioned in an operative relationship with another surface of said rigid disk.

73. The method according to claim 72, wherein the step of rotating said rigid disk is performed prior to positioning said read/write recording element and said another read/write recording element in operative relationship with their respective disk surfaces, and further wherein the positioning of said read/write recording element and said another read/write recording element is performed while said disk is rotating.

* * * * *